United States Patent
Ueda et al.

(10) Patent No.: US 8,824,787 B2
(45) Date of Patent: Sep. 2, 2014

(54) SILHOUETTE CORRECTION METHOD AND SYSTEM AND SILHOUETTE EXTRACTION METHOD AND SYSTEM

(71) Applicants: Dunlop Sports Co. Ltd., Kobe (JP); Sumitomo Rubber Industries, Ltd., Kobe (JP); Yoshiaki Shirai, Osaka (JP); Nobutaka Shimada, Osaka (JP)

(72) Inventors: Masahiko Ueda, Kobe (JP); Yoshiaki Shirai, Osaka (JP); Nobutaka Shimada, Osaka (JP)

(73) Assignees: Dunlop Sports Co., Ltd., Kobe (JP); Sumitomo Rubber Industries, Ltd., Kobe (JP); Yoshiaki Shirai, Osaka (JP); Nobutaka Shimada, Osaka (JP)

( * ) Notice: Subject to any disclaimer, the term of this patent is extended or adjusted under 35 U.S.C. 154(b) by 78 days.

(21) Appl. No.: 13/707,218

(22) Filed: Dec. 6, 2012

(65) Prior Publication Data
US 2013/0177239 A1    Jul. 11, 2013

(30) Foreign Application Priority Data

Dec. 7, 2011 (JP) ................................. 2011-268286
Dec. 7, 2011 (JP) ................................. 2011-268287

(51) Int. Cl.
*G06K 9/00* (2006.01)

(52) U.S. Cl.
USPC ........... 382/165; 382/162; 382/107; 382/168; 382/242; 382/266

(58) Field of Classification Search
CPC .......... G06T 2207/20144; G06T 2207/30221; G06T 7/0079; G06T 7/0093; G06T 7/81; G06K 9/00362; G06K 9/4652
See application file for complete search history.

(56) References Cited

U.S. PATENT DOCUMENTS

| | | | | |
|---|---|---|---|---|
| 6,115,495 | A * | 9/2000 | Tachikawa et al. | 382/165 |
| 7,102,638 | B2 * | 9/2006 | Raskar et al. | 345/428 |
| 2008/0137950 | A1 * | 6/2008 | Park et al. | 382/168 |

FOREIGN PATENT DOCUMENTS

JP    2011-78069 A    4/2011

* cited by examiner

*Primary Examiner* — Ali Bayat
(74) *Attorney, Agent, or Firm* — Birch, Stewart, Kolasch & Birch, LLP

(57) ABSTRACT

A method and system for correcting a silhouette of a person extracted from an image by labeling each pixel as the person or the background are disclosed. The pixels in a target region are corrected by: a step in which, by the use of pixels in the target region labeled as the person, a person histogram is created; a step in which, by the use of pixels in the target region labeled as the background, a background histogram is created; a step in which, for each pixel in the target region, by the use of the person histogram, the background histogram and color data of each pixel in the target region, first connective costs of the pixel to the color data of the person and the background are calculated; and a step in which, for each pixel in the target region, a second connective cost of the pixel is calculated.

14 Claims, 45 Drawing Sheets

FIG.39

| 3 | 3 | 3 | 3 | 3 | 3 | 3 | 3 | 3 |
|---|---|---|---|---|---|---|---|---|
| 3 | 2 | 2 | 2 | 2 | 2 | 2 | 2 | 3 |
| 3 | 2 | 1 | 1 | 1 | 1 | 1 | 2 | 3 |
| 3 | 2 | 1 | h | h | h | 1 | 2 | 3 |
| 3 | 2 | 1 | h | h | h | 1 | 2 | 3 |
| 3 | 2 | 1 | h | h | h | 1 | 2 | 3 |
| 3 | 2 | 1 | 1 | 1 | 1 | 1 | 2 | 3 |
| 3 | 2 | 2 | 2 | 2 | 2 | 2 | 2 | 3 |
| 3 | 3 | 3 | 3 | 3 | 3 | 3 | 3 | 3 |

Za

FIG.46B
FIG.46A example 1 ref. 1 original

SILHOUETTE CORRECTION METHOD AND SYSTEM AND SILHOUETTE EXTRACTION METHOD AND SYSTEM

BACKGROUND OF THE INVENTION

The present invention relates to a method and a system for correcting a silhouette of a person extracted from a still image including the person and something in the background, and a method and a system for extracting a silhouette of a person from a plurality of frames captured from a moving image of the person swing a golf club.

For the golfers who are desirous of improving golf techniques, it is very important to acquire appropriate golf swing.

For that purpose, in a classical way, diagnoses on golf swing to point out problems are made by a person such as a teaching pro, using a video of the golfer swing a golf club.

In recent years, on the other hand, there has been proposed an attempt to conduct diagnosis on the swing of a golfer, based on the silhouette of the golfer extracted by image processing, from a frame (a still image showing his/her state at address, top of backswing or the like) captured from a moving image of the golfer taking a swing.

In many cases, it is required to extract an accurate silhouette of a person only from a still image including the person with something in the background.

In order to extract the silhouette, each pixel of the still image is labeled as the person or the background. And by rendering an image using only the pixels labeled as the person, the silhouette of the person can be obtained. Such a method has been proposed by the present applicant in the following patent document:

Japanese Patent Application Publication No. 2011-78069.

According to the technique disclosed in this patent document, a certain level of accuracy can be obtained in the silhouette extraction, but there is a problem such that the silhouette of a person has certain noise.

SUMMARY OF THE INVENTION

* Silhouette Correction Method and System

It is therefor an object of the present invention to provide a silhouette correction method and a silhouette correction system by which the pixels each labeled as the silhouette or the background are corrected to reduce the noise included in the extracted silhouette.

A silhouette correction method according to the present invention is to correct a silhouette of a person which is extracted from a frame including the person and the background by labeling each pixel of the frame as the person or the background, wherein pixels in a target region which is at least part of the frame are relabeled.

The silhouette correction method comprises a step in which, by the use of pixels in the target region labeled as the person,
a person histogram of which frequency and class are the number of pixels and color data of the pixels, respectively, is created, a step in which, by the use of pixels in the target region labeled as the background,
a background histogram of which frequency and class are the number of pixels and color data of the pixels, respectively, is created, a step in which, for each pixel in the target region, by the use of the person histogram, the background histogram and color data of each pixel in the target region,
a first connective cost of the pixel which represents the degree of similarity to the color data of the person and the degree of similarity to the color data of the background is calculated, a step in which, for each pixel in the target region, a second connective cost of the pixel which represents continuity of the color data of the pixel from adjacent pixels is calculated by the use of difference values from the adjacent pixels, a correcting step in which a graph of which vertices are the pixels in the target region, and of which edges between the vertices are the first and second connective costs is prepared, and a min-cut by which the graph is divided into two so that the sum of the first and second connective costs becomes minimum, is computed, and based on the min-cut, the pixels in the target region are relabeled to correct the silhouette.

Therefore, a pixel whose degree of similarity to the color data of the person is low and whose continuity in the color data from the adjacent pixels is low, is relabeled as the background, and a pixel whose degree of similarity to the color data of the background is low and whose continuity in the color data from the adjacent pixels is low, is relabeled as the person. Thereby, the noise or error included in the primarily extracted silhouette can be reduced, and an accurate silhouette of the person can be obtained.

The silhouette correction method according to the present invention may have the following features F1-F4:

F1: The first connective cost is calculated by the following expressions $$Ph_{(I)(x, y)} = nh_{(I)}(C_{(I)(x, y)}) \times \lambda/th$$

and $$Pb_{(I)(x, y)} = nb(I)(C_{(I)(x, y)}) \times \lambda/tb$$

wherein $Ph_{(I)(x, y)}$: the first connective cost to the color data of the person, of a target pixel having x-Y coordinate (x, y) and color data (I), $nh_{(I)}(C_{(I)(x, y)})$: the frequency in the person histogram, of pixels having the color data (I) of the target pixel $C_{(I)(x, y)}$, th: total number of the pixels in the target region which are labeled as the person, $Pb_{(I)(x, y)}$: the first connective cost to the color data of the background, of the target pixel having x-Y coordinate (x, y) and color data (I), $nb_{(I)}(C_{(I)(x, y)})$: the frequency in the background histogram, of pixels having the color data (I) of the target pixel $C_{(I)(x, y)}$, tb: the total number of the pixels in the target region which are labeled as the background, and $\lambda$: a constant.

F2: The second connective cost is calculated by the following expression $$Pd = k \times \epsilon / Dp$$

wherein

Pd: the second connective cost of a target pixel, k: a constant, $\epsilon$: a constant which is more than 0 and less than 1 when the target pixel is located at the border of the silhouette of the person, otherwise 1, and Dp: a difference value between the target pixel and an adjacent pixel.

F3: with respect to each pixel relabeled as the person from the background,
the frequency $nb_{(I)}(C_{(I)(x, y)})$ is multiplied by a constant more than 1 to increase the degree of similarity to the color data of the background, and the first and second connective costs are again calculated, and then the correcting step is again carried out.

F4: The method further comprises a step in which an image of logical product of the silhouette before corrected and the silhouette after corrected is prepared and displaced.

According to the present invention, a silhouette correction system is for implementing the above-mentioned silhouette correction method, and comprises a memory in which data on the pixels of the frame are stored, and an arithmetic section, the arithmetic section including
a person histogram creating section,
a background histogram creating section,
a first connective cost calculating section,
a second connective cost calculating section, and
a correcting section,
wherein the person histogram creating section creates, by the use of pixels in the target region labeled as the person, a person histogram of which frequency and class are the number of pixels and color data of the pixels, respectively, the background histogram creating section creates, by the use of pixels in the target region labeled as the background, a background histogram of which frequency and class are the number of pixels and color data of the pixels, respectively, the first connective cost calculating section calculates, for each pixel in the target region, a first connective cost of the pixel representing the degree of similarity to the color data of the person and representing the degree of similarity to the color data of the background, by the use of the person histogram, the background histogram and color data of each pixel in the target region, the second connective cost calculating section calculates, for each pixel in the target region, a second connective cost of the pixel representing continuity of the color data of the pixel from adjacent pixels, by the use of difference values from the adjacent pixels, the correcting section prepares a graph in which the pixels are vertices and the first and second connective costs are edges between the vertices, and computes a min-cut by which the graph is divided into two so that the sum of the first and second connective costs becomes minimum, and relabels the pixels in the target region based on the min-cut to correct the silhouette.

* Silhouette Extraction Method and System

As explained, according to the technique disclosed in the above-mentioned patent document, a certain level of accuracy can be obtained in the silhouette extraction, but there is a problem such that, if the person has a color approximate to a color of the background in the vicinity of their boundary, it is difficult to discriminate one from the other to correctly extract the silhouette.

Therefore, another object of the present invention is to provide a silhouette extraction method and a silhouette extraction system by which the person can be differentiated from the background even if they have approximate colors.

A silhouette extraction method according to the present invention is to extract a silhouette of a person swing a golf club, from one of a plurality of frames captured from a moving image of the person swing the golf club, by utilizing color data obtained from the plurality of frames.

The method comprises the following steps:

a step in which, with respect to each pixel in one of the frames, an across-frame subset which is a subset of the pixels of all of the frames at the position of the concerned pixel is created, a step in which, with respect to each of the across-frame subsets, a histogram of which frequency and class are the number of frames and color data of the pixels, respectively, is created, a step in which, from the captured frames, an address state frame which is a frame including the person addressing a ball, is extracted, a step in which, for the address state frame, predetermined feature points of a person with a golf club are located, a step in which, based on the located positions of the feature points, a mask region which is a region including the person, the golf club and a part of the background around the person and the golf club is defined, a step in which, based on the located positions of the feature points, a human body zone in which pixels included therein have a high probability of representing the person, is defined within the mask region, a step in which, based on color data of the pixels in the human body zone of the address state frame and the histogram regarding each pixels in the human body zone, a human body range which is a class range of the histogram representing the person, is determined for each of the histograms, a step in which the determined human body ranges are propagated to the histograms regarding the pixels outside the human body zone, a step in which, based on the histogram regarding each pixel in an unmask region other than the mask region and color data of the pixels in the unmask region of the address state frame, a background range which is a class range of the histogram representing the background is determined for each of the histograms, a step in which the determined background ranges are propagated to the histograms regarding the pixels in the mask region.

The silhouette extraction method according to the present invention may have the following features F5-F10:

F5: The histogram of the across-frame subset includes a first histogram in which the color data are brightness of all of the pixels in the across-frame subset, a second histogram in which the color data are hue of the pixels in the across-frame subset having chromatic colors, a third histogram in which the color data are brightness of the pixels in the across-frame subset having achromatic colors.

F6: The feature points are the top of head, forehead, back, waist, back of knee, heel, toe, thigh, hand, and shoulder of a human body in an address state, and a club head of the golf club.

F7: The above-mentioned step in which the mask region is defined, comprises a step of defining an initial stage mask region by connecting the feature points, and a step of expanding the initial stage mask region by a predetermined extent or pixels.

F8: The above-mentioned step in which the human body zone is defined, comprises a step in which, based on the feature points, base points which are considered as points on the human body are defined at positions within the initial stage mask region, and a step in which, by the use of the base points, the human body zone is determined.

F9: The method further comprises
a step of detecting pixels in the above-mentioned one of the frames which pixels represent a pillar of a golf practice range, and
in the above-mentioned step in which the determined background ranges are propagated to the histograms regarding the pixels in the mask region,
the propagation bypasses the detected pixels which represent the pillar.

F10: The method further comprises a step of checking the consistency of the determined background range and the determined human body range.

According to the present invention, a silhouette extraction system is for implementing the above-mentioned silhouette extraction method and comprises:
a camera for taking a moving image,
a memory for storing the moving image, and
an arithmetic section,
the arithmetic section including
a across-frame-subset creating section,
a histogram creating section, and
a judgment section,
wherein
the across-frame-subset creating section creates, with respect to each pixel in one of the frames, an across-frame subset which is a subset of the pixels of all of the frames at the position of the concerned pixel,
the histogram creating section creates, with respect to each of the across-frame subsets, a histogram of which frequency and class are the number of frames and color data of the pixels, respectively,
the judgment section includes
an address state frame extracting section,
a feature point locating section,
a mask region defining section,
a human body zone setting section,
a human body range determining section,
a human body range propagating section,
a background range determining section, and
a background range propagating section,
wherein
the address state frame extracting section extracts from the captured frames, an address state frame which is a frame including the person addressing a ball,
the feature point locating section locates, for the address state frame, predetermined feature points of a person with a golf club,
the mask region defining section defines, based on the located positions of the feature points, a mask region which is a region including the person, the golf club and a part of the background around the person and the golf club.
the human body zone setting section defines a human body zone within the mask region, based on the located positions of the feature points, the human body zone is such that pixels included therein have a high probability of representing the person,
the human body range determining section determines, based on color data of the pixels in the human body zone of the address state frame and the histogram regarding each pixels in the human body zone, a human body range for each of the histograms, the human body range is a class range of the histogram representing the person,
the human body range propagating section propagates the determined human body ranges to the histograms regarding the pixels outside the human body zone, the background range determining section determines, based on the histogram regarding each pixel in an unmask region other than the mask region and color data of the pixels in the unmask region of the address state frame, a background range for each of the histograms, the background range is a class range of the histogram representing the background,
the background range propagating section propagates the determined background ranges to the histograms regarding the pixels in the mask region.

According to the present invention, therefore, even if the person and the background have approximate colors, the person can be differentiated from the background owing to the propagation of the human body ranges and the propagation of the background ranges. Accordingly, it is possible to accurately extract the silhouette of the person.

BRIEF DESCRIPTION OF THE DRAWINGS

FIG. 1-FIG. 17B relate to silhouette correction method and system.
FIG. 18-FIG. 52 relate to silhouette extraction method and system.
FIG. 1 is a line drawing for explaining a frame including a person with a golf practice range in the background.
FIG. 2 is an example of the silhouette of the person extracted from the frame shown in FIG. 1.
FIG. 3 is a conceptual diagram showing a silhouette extraction system as an embodiment.
FIG. 4 is a block diagram of the arithmetic section thereof.
FIG. 5 is a flowchart of the silhouette extraction method.
FIG. 6 is a diagram for explaining target regions of the frame.
FIG. 7 is person histograms of the respective target regions.
FIG. 8 is background histograms of the respective target regions.
FIG. 9 is a histogram for explaining a first connective cost.
FIG. 10 is a diagram showing an arrangement of pixels in a micro area of the frame.
FIG. 11 is a graph for explaining a second connective cost by the use of a 3×3 pixel arrangement.
FIG. 12 is a diagram for explaining a min-cut of a graph.
FIG. 13 is a flowchart of a final processing.
FIG. 14 is an original image of a person as an example 1.
FIG. 16 is an original image of the person as an example 2.
FIGS. 17A and 17B show silhouettes of the person extracted from the image of FIG. 16, before and after corrected, respectively.
FIG. 18 is a conceptual diagram showing a silhouette extraction system as an embodiment.
FIG. 19 is a conceptual diagram showing the arithmetic section thereof.
FIG. 20 is a flowchart of the silhouette extraction method as an embodiment.
FIG. 21 is a line drawing for explaining a picture composition and a camera angle.
FIGS. 23A, 23B, and 23C show color histograms of pixels of across-frame subsets.
FIG. 24 is a flowchart of an example of the determination processing.
FIG. 25 is a diagram for explaining the feature points of a person.

FIG. 26 is a difference image of an address state frame and a top-of-backswing frame.

FIG. 27 is a diagram for explaining the feature points of the heel and toe.

FIG. 28 is a diagram for explaining the feature point of a thigh.

FIG. 29 is a diagram for explaining the feature point of a top of head.

FIG. 30 is a diagram for explaining the feature point of a forehead.

FIG. 31 is a diagram for explaining the feature point of a waist.

FIG. 32 is a diagram for explaining the feature point of a back of knee.

FIG. 33 is a diagram for explaining the feature points of a back and a shoulder region.

FIG. 34 is a diagram for explaining a mask region.

FIG. 35 is a diagram for explaining a human body zone.

FIG. 36 is a flowchart of a human body range determining step.

FIG. 37 is a graph for explaining characteristic positions of a histogram.

FIG. 38 is a flowchart of a human body range propagating step.

FIG. 39 is a distance map for explaining distances from the human body zone.

FIG. 40 is a graph for explaining characteristic positions of a histogram.

FIG. 41 is a diagram for explaining the concept of the silhouette extraction method according to the present invention.

FIG. 42 is a flowchart of a consistency check step.

FIG. 43 is a explanatory diagram for explaining the consistency check step.

FIGS. 46A and 46B show a finish-state frame and the silhouette extracted therefrom by the silhouette extraction method in this embodiment.

FIG. 47 is a line drawing for explaining an address state frame including pillars.

FIG. 48 is an arrangement of pixels for explaining a background range propagating step.

FIG. 49 shows an original image and silhouettes extracted therefrom as an example 1 and Ref. 1.

FIG. 50 shows an original image and silhouettes extracted therefrom as an example 2 and Ref. 2.

FIG. 51 shows an original image and silhouettes extracted therefrom as an example 3 and Ref. 3.

FIG. 52 shows an original image and silhouettes extracted therefrom as an example 4 and Ref. 4.

DESCRIPTION OF THE PREFERRED EMBODIMENTS

Embodiments of the present invention will now be described in detail in conjunction with accompanying drawings.

\* Embodiments Relating to the Silhouette Correction Method and System

With respect to the method and system for correcting a silhouette of a person extracted from a still image including the person and something in the background, embodiments of the present invention will now be described in detail in conjunction with FIG. 1-FIG. 17.

Figure 1:
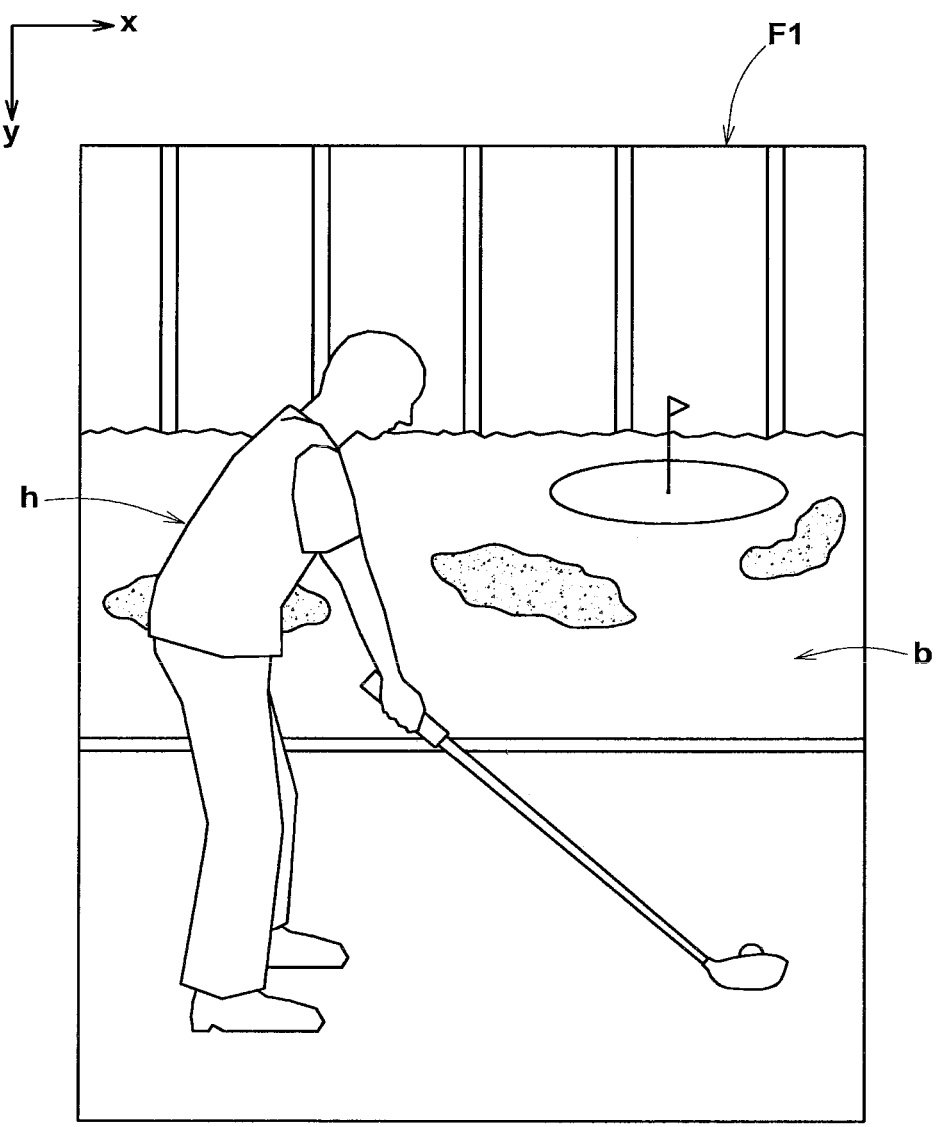

FIG. 1 is a line drawing for explaining a frame F1 which is a 2D still image of a person (h) with a golf practice range in the background (b) wherein the person (h) is just addressing a ball.

This frame F1 is prepared by a digital still camera or by capturing from a moving image (or image sequence) take by a digital movie camera.

The frame F1 is an aggregation of pixels each having its color data.

With respect to the frame F1, image processing such as the silhouette extraction method disclosed in the patent document 1 (hereinafter "preprocessing") is executed so that each of the pixels of the frame F1 is labeled as the person (h) or the background (b).

Figure 2:
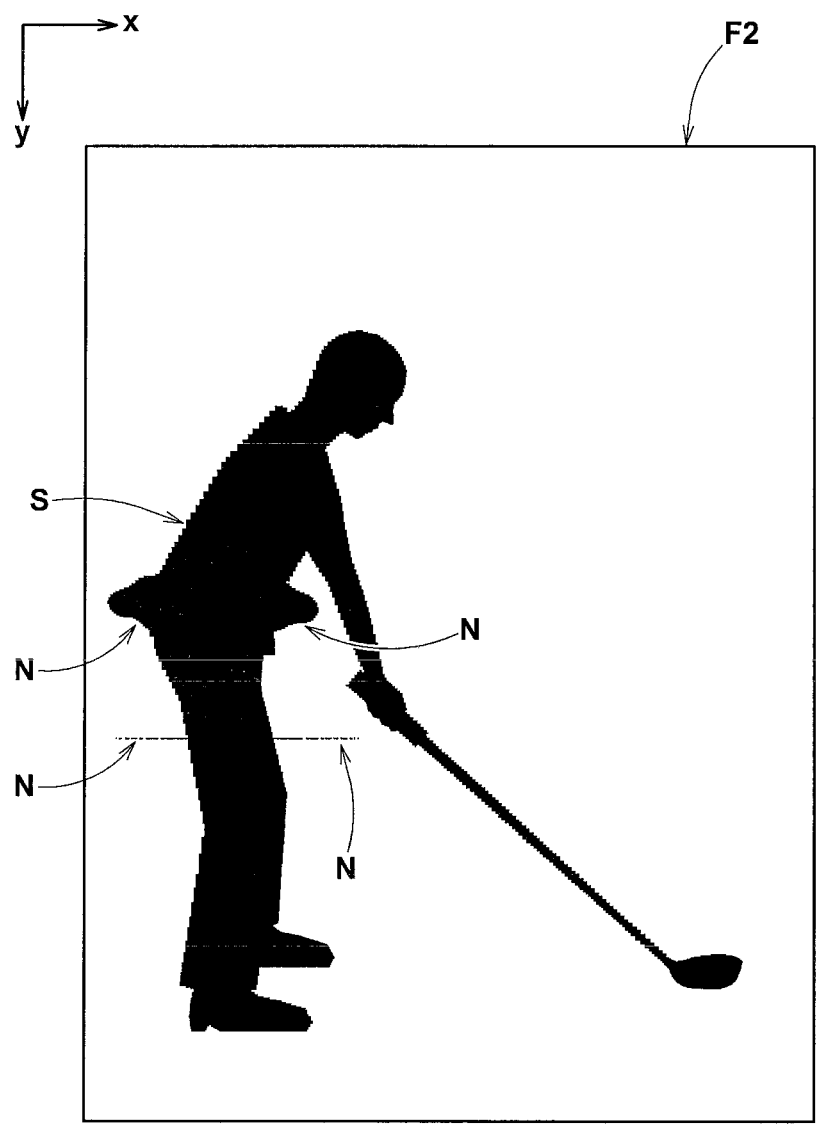

FIG. 2 shows a frame F2 (image) rendered by only the pixels labeled as the person (h) in black.
Thus, the silhouette S of the person (h) in the address state is extracted from the frame F1 including the person (h) and the background (b).
The silhouette of the person S is used for diagnoses of golf swing as explained above for example.

As to the preprocessing, various methods may be used as well as the method disclosed in the above-mentioned patent document 1.

After the preprocessing, usually, as shown in FIG. 2, the silhouette S includes part of the background (b) as noise N—vice versa. Namely, there is a possibility that the pixels which have to be labeled as the person (h) are incorrectly labeled as the background (b). This is also noise.

According to the present invention, the extracted silhouette of the person S is corrected into an exact silhouette by changing the labels of the pixels in a target region which is at least part of the frame F.

Figure 3:
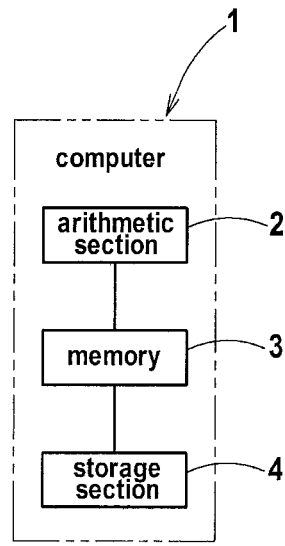

The silhouette correction system to execute the method according to the present invention is essentially composed of a computer 1 which, as shown in FIG. 3, comprises an arithmetic section 2, a memory 3, and a storage section 4.

As to the memory 3, for example, RAM or the like is used. In the storage section, a nonvolatile storage medium, e.g. a magnetic disc and the like is used.

As to the arithmetic section 2 to perform various calculations, for example, a CPU is used.

Figure 4:
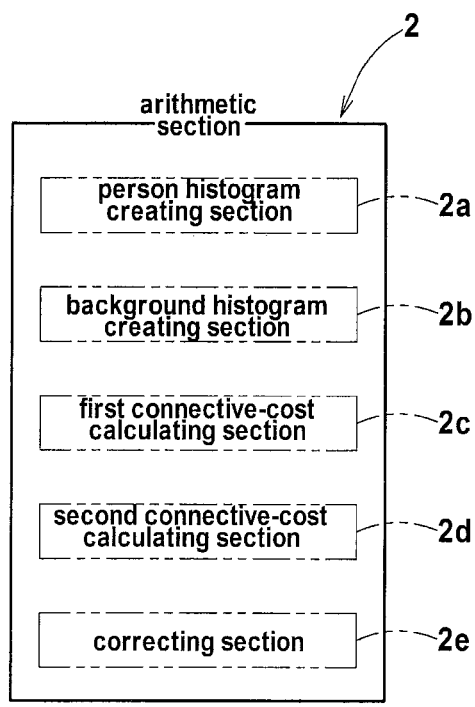

As shown in FIG. 4, the arithmetic section 2 includes
a person histogram creating section 2a,
a background histogram creating section 2b,
a first connective cost calculating section 2c,
a second connective cost calculating section 2d, and
a correcting section 2e.

Figure 5:
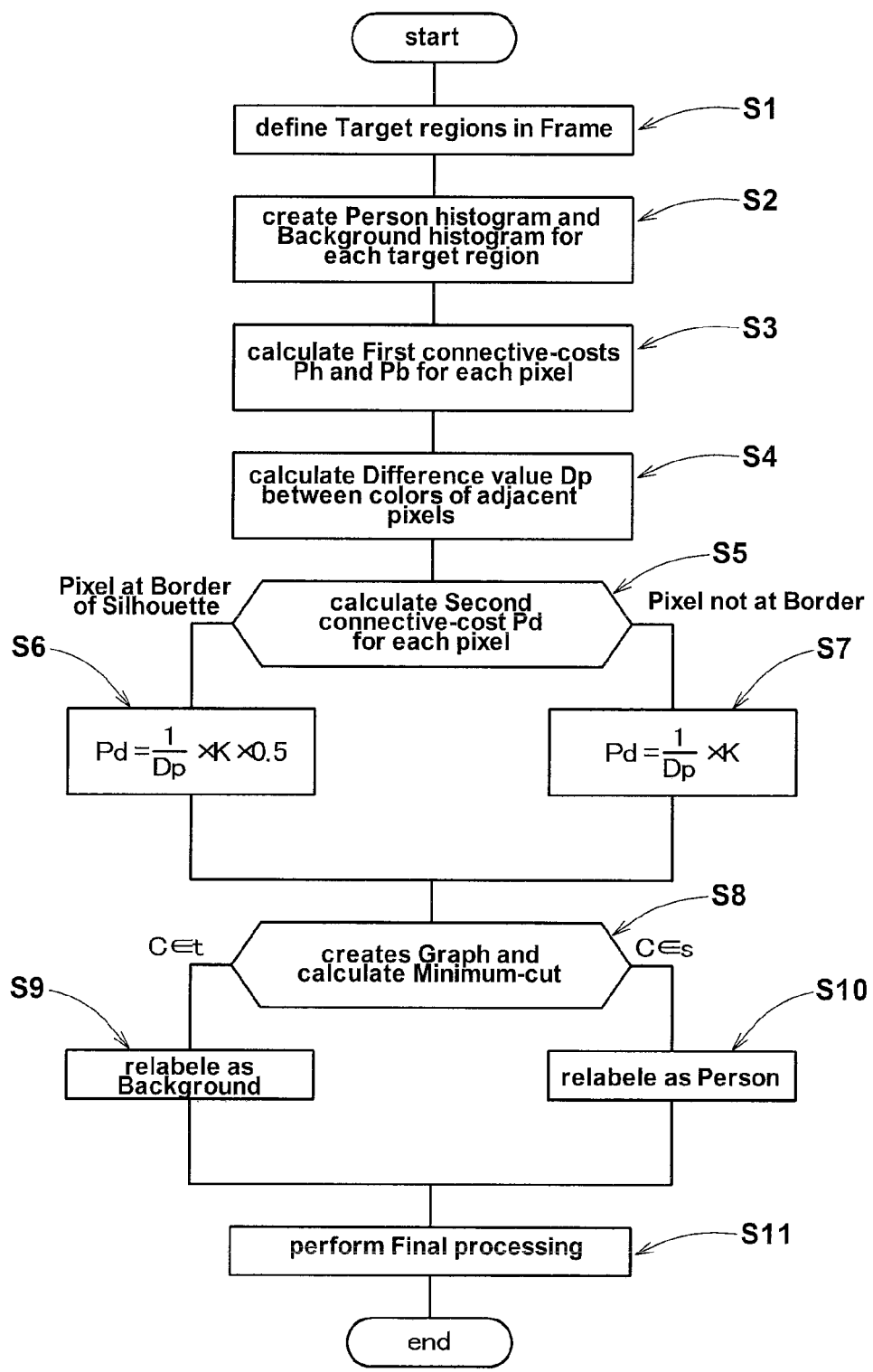

FIG. 5 shows a flowchart of the silhouette correction method executed by the system 1 in this embodiment.

At the time of START, the first labeling has been done. Namely, as explained above, through the preprocessing, each of the pixels of the frame has been labeled as the person or the background.

This embodiment is therefore, intended to obtain a highly accurate silhouette of the golfer usable for diagnoses of golf swing.

Figure 6:
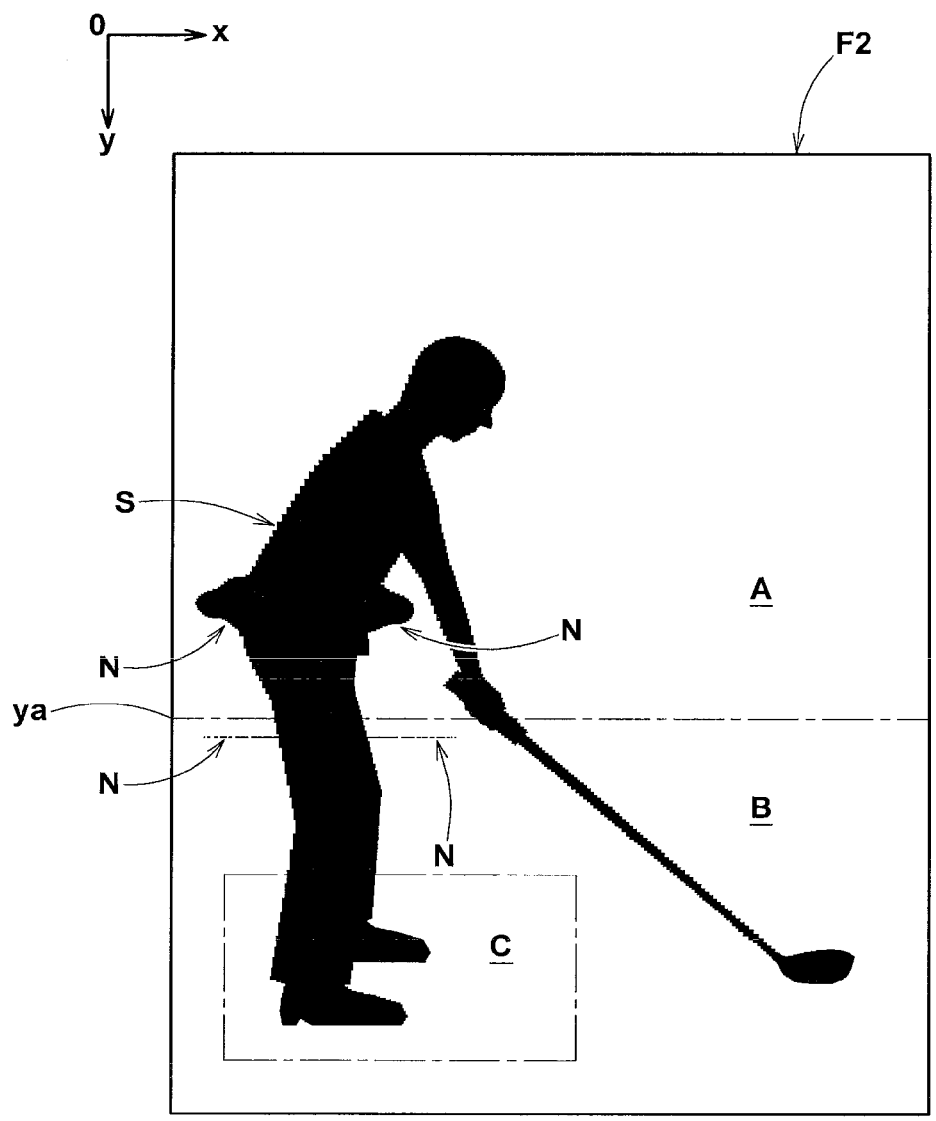

In this embodiment, first, a target region or regions to be subjected to a correcting operation is defined in the target frame F2.—Step S1
In the example shown in FIG. 6, three target regions A, B and C are defined.
Preferably, pixels having similar color data with regard to the brightness and hue are grouped into one target region.
Such setting may be made arbitrarily by the user.
In the example shown in FIG. 6, the target region A is an upper region of the frame which includes an upper body of the person (h) and a far-field part of the background (b).

With respect to the y-coordinate of the frame, the pixels in this region A have y-coordinate values not more than a constant value ya.

The target region C is a rectangular region of the frame which includes the feet of the person (h) and the periphery thereof.

The target region B is a lower region of the frame on the under side of the target region A excepting the target region C. This region B includes a near-field part of the background.

Such sectioning or zoning of the frame for the target regions is not limited to this example. It can be made arbitrarily according to the position of the silhouette S relative to the frame. In addition, the target region as a region to be corrected may be defined to cover the whole area of the frame F2 or a specific partial area including much noise N.

With respect to each region, the following processing is executed.

With respect to each of the target regions A, B and C, the person histogram creating section 2a creates a person histogram Nh, using only the pixels labeled as the person (h).—Step S2

Figure 7:
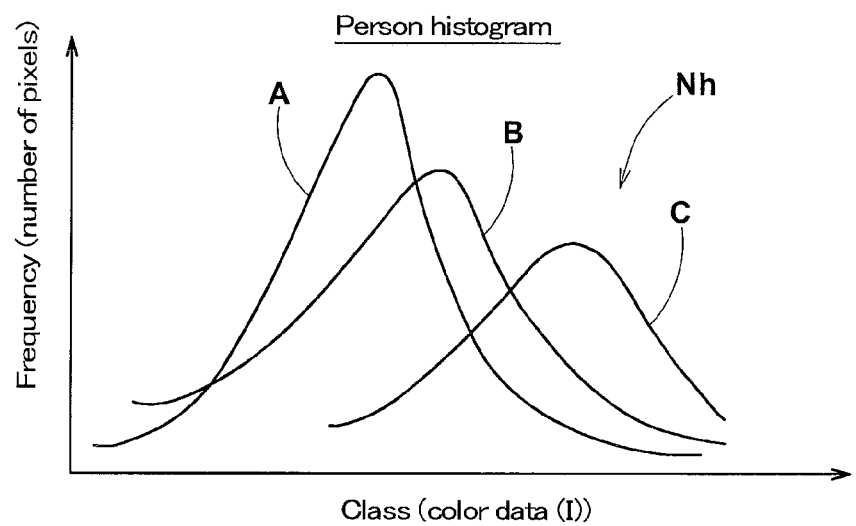

FIG. 7 shows an example of the person histogram Nh.

In the person histogram Nh, the class is color data (I) of the pixels, and the frequency is the number of pixels.

As to the color data (I), various parameters which can quantify the color, e.g. brightness, HSV or RGB, may be used.

Such color data are not included in the pixels of the frame F2. Therefore, the color data of the pixels of the original image of the frame F1 (as shown in FIG. 1) from which the frame F2 is created, are used to create the person histogram.

In this example, therefore, with respect to each of the target regions A, B and C, the person histogram Nh is created as shown in FIG. 7, wherein the curved line A is the person histogram of the target region A, the curved line B is the person histogram of the target region B, and the curved line C is the person histogram of the target region C.

Next, with respect to each of the target regions A, B and C, the background histogram creating section 2b creates the background histogram Nb, using only the pixels labeled as the background (b).—Step S2

Figure 8:
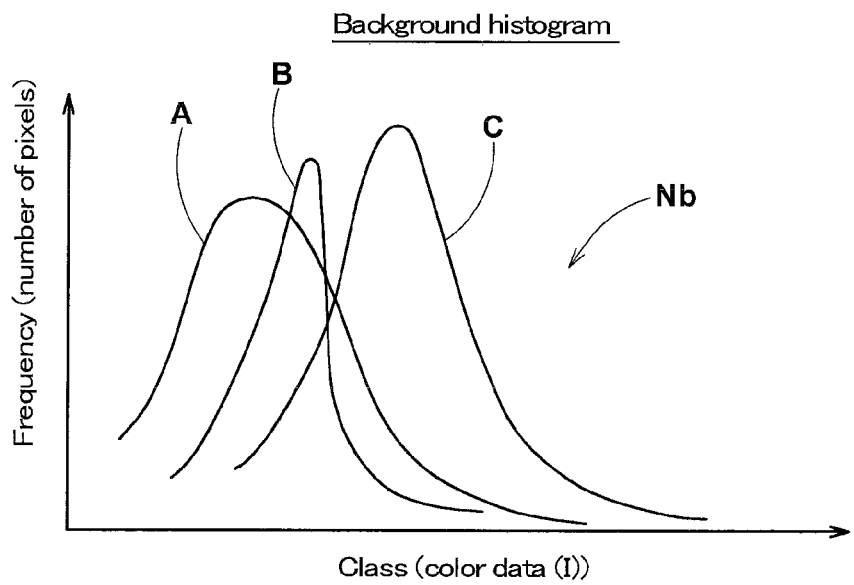

FIG. 8 shows an example of the background histogram Nb.

Similarly to the person histogram Nh, in the background histogram Nb, the class is color data (I) of the pixels, and the frequency is the number of pixels.

As to the color data (I), various parameters which can quantify the color, e.g. brightness, HSV or RGB, may be used.

Such color data are not included in the pixels of the frame F2. Therefore, the color data of the pixels of the original image of the frame F1 (as shown in FIG. 1) from which the frame F2 is created, are used to create the background histogram.

In this example, therefore, with respect to each of the target regions A, B and C, the background histogram Nh is created as shown in FIG. 8, wherein the curved line A is the background histogram of the target region A, the curved line B is the background histogram of the target region B, and the curved line C is the background histogram of the target region C.

The person histograms Nh and the background histograms Nb as shown in FIG. 7 and FIG. 8 are subjected to an optional smoothing process.

When the color data (I) are HSV, the histogram is created for each of H(hue), S(chroma) and V(brightness).

Next, for each of the pixels in the target region, first connective costs Ph and Pb are calculated by the first connective cost calculating section 2c.—Step S3

The first connective cost Ph is a parameter which represents the degree of similarity of each pixel to the color data of the person, using the color data (I) of each pixel in the target region and the person histogram Nh.

The first connective cost Pb is a parameters which represents the degree of similarity of each pixel to the color data of the background, using the color data (I) of each pixel in the target region and the background histogram Nb.

With respect to one pixel, a first connective cost Ph and a first connective costs Pb are calculated.

In this example, the first connective costs are computed by the use of the following expressions:

$$Ph_{(I)(x,y)} = nh_{(I)}(C_{(I)(x,y)}) \times \lambda / th$$

and $$Pb_{(I)(x,y)} = nb_{(I)}(C_{(I)(x,y)}) \times \lambda / tb$$

wherein $Ph_{(I)(x,y)}$: the first connective cost to the color data of the person, of a target pixel having x-Y coordinate (x, y) and color data (I), $nh_{(I)}(C_{(I)(x,y)})$: the frequency in the person histogram, of pixels having the color data of the target pixel $C_{(I)(x,y)}$, th: the total number of the pixels in the target region which are labeled as the person, $Pb_{(I)(x,y)}$: the first connective cost to the color data of the background, of the target pixel having x-Y coordinate (x, y) and color data (I), $nb_{(I)}(C_{(I)(x,y)})$: the frequency in the background histogram, of pixels having the color data of the target pixel $C_{(I)(x,y)}$, tb: the total number of the pixels in the target region which are labeled as the background, and $\lambda$: a constant which is 10000 in this example.

Figure 9:
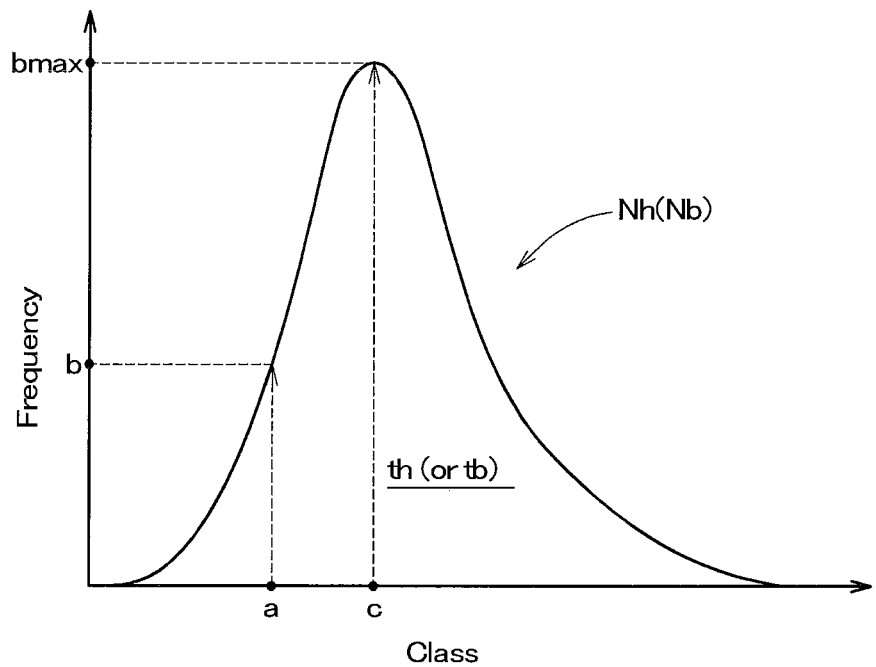

FIG. 9 shows a person (or background) histogram for explaining the first connective cost.

If the class and the frequency of the target pixel are (a) and (b), respectively, then the first connective cost to the color data of the person Ph=b×λ/th, and the first connective cost to the color data of the background Pb=b×λ/tb.

When the class is (c), the frequency becomes a maximum (bmax) and the first connective cost becomes a maximum value.

The first connective cost of a pixel expresses the degree of similarity of the color of the pixel to the color of the person (or the background).

That is, with the increase in the first connective cost, the color of the pixel becomes closer to the color of the maximum frequency in the person (or the background) histogram.

Conversely, with the decrease in the first connective cost, the color of the pixel becomes different from the color of the maximum frequency in the person (or the background) histogram. Therefore, the pixel has a high probability of noise.

Incidentally, the values of the first connective cost calculated for the respective pixels are stored in the memory 3 or storage section 4.

Next, a second connective cost Pd is calculated, for each of the pixels in the target region, by the second connective cost calculating section 2d.—Steps S4-S7

The second connective cost Pd is a parameter which represents the continuity of the color between a pixel in the target region and an adjacent pixel, by the use of difference values therebetween.

In this example, the second connective cost Pd of the target pixel is calculated by the following expression (3)—Steps S6 and S7, $$Pd = k \times \epsilon / Dp \quad (3)$$

wherein k: a constant which is this embodiment 10000,

ε: a constant which is more than 0 and less than 1 (in this example 0.5) when the target pixel is located at the border of the silhouette of the person, otherwise 1, and Dp: difference value (nonzero) between the color of the target pixel and the color of an adjacent pixel.

The difference value Dp from the color of the adjacent pixel is calculated as the color distance between the pixels concerned.—Step S4

Figure 10:
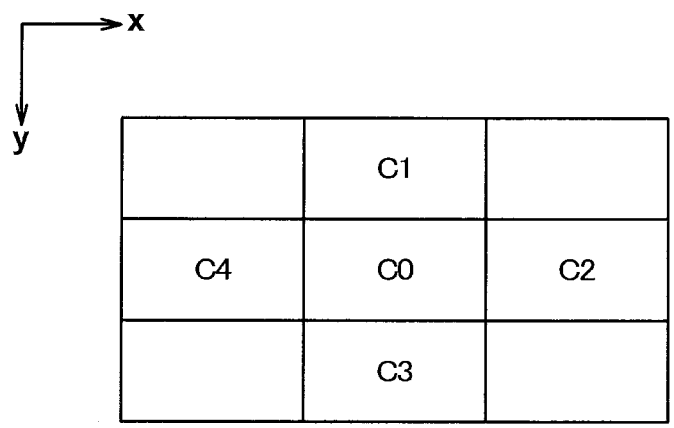

When the target pixel is C0 in an example shown in FIG. 10, calculated are four difference values Dp1, Dp2, Dp3 and Dp4 from four pixels C1, C2, C3 and C4 on the left, right, top and bottom of the target pixel C0. These difference values are indicated as follows:

$$Dp1(C0, C1), Dp2(C0, C2), Dp3(C0, C3), Dp4(C0, C4)$$

when the color data (I) of a pixel are H(hue), S(chroma) and V(brightness), and the color vector of the hue H1, chroma S1 and brightness V1 of one pixel is C1, and the color vector of the hue H2, chroma S2 and brightness V2 of another pixel is C2, then the color distance D(C1, C2) therebetween is given by the following expression:

$$D(C1, C2) = a\Delta H' + b\Delta S' + c\Delta V'$$

wherein a, b, c: constants (in this example, a=5.1, b=2.25, c=2.65)

$$\Delta H' = \Delta H / 4.0$$

$$\Delta S' = \Delta S / 2.0$$

$$\Delta V' = \Delta V / 2.0$$

$$\Delta H = \{(X1 - X2)^2 + (Y1 - Y2)^2\}^{1/2}$$

$$\Delta S = |S1/100 - S2/100|$$

$$\Delta V = |V1/100 \oplus V2/100|$$

$$X1 = S'\text{avg} \cos(H1 \times 3.6)$$

$$Y1 = S'_{avg\,sin}(H1 \times 3.6)$$

$$X2 = S'_{avg\,cos}(H2 \times 3.6)$$

$$Y2 = S'_{avg\,sin}(H2 \times 3.6)$$

$$S'_{avg} = (S1' + S2')/2$$

$$S1' = \log_{10}(S1/100 \times 99 + 1.0)$$

$$S2' = \log_{10}(S2/100 \times 99 + 1.0)$$

As explained later, the silhouette correction method according to the present invention comprises a step of calculating the border between the person and the background (a step of calculating cut). Therefore, it is desirable for such processing that the value of the second connective cost becomes smaller as the continuity of the color becomes less. In this embodiment, therefore, in the calculation of the second connective cost, inverse of the color distance is used. Thereby, in the case of a pixel whose color distance from the adjacent pixel is large, namely, a pixel considered as being located at the boundary between the person and the background, the second connective cost is estimated as being small, In the pixels labeled as the person during the preprocessing, color distances of pixels at "the border" abutting the background, from the surrounding pixels become more than color distances of pixels not at "the border". As a result, the second connective costs of the pixels on "the border" have a high probability of becoming low. With respect to the pixels at "the border", they have a high degree of potential for including pixels of the person and pixels of the background, therefore, in this embodiment, the second connective cost is calculated as being smaller by multiplying the constant E of less than 1.

Next, the correcting section 2e creates a graph by the use of the first connective costs Ph and Pb and the second connective cost Pd.—step S8

Figure 11:
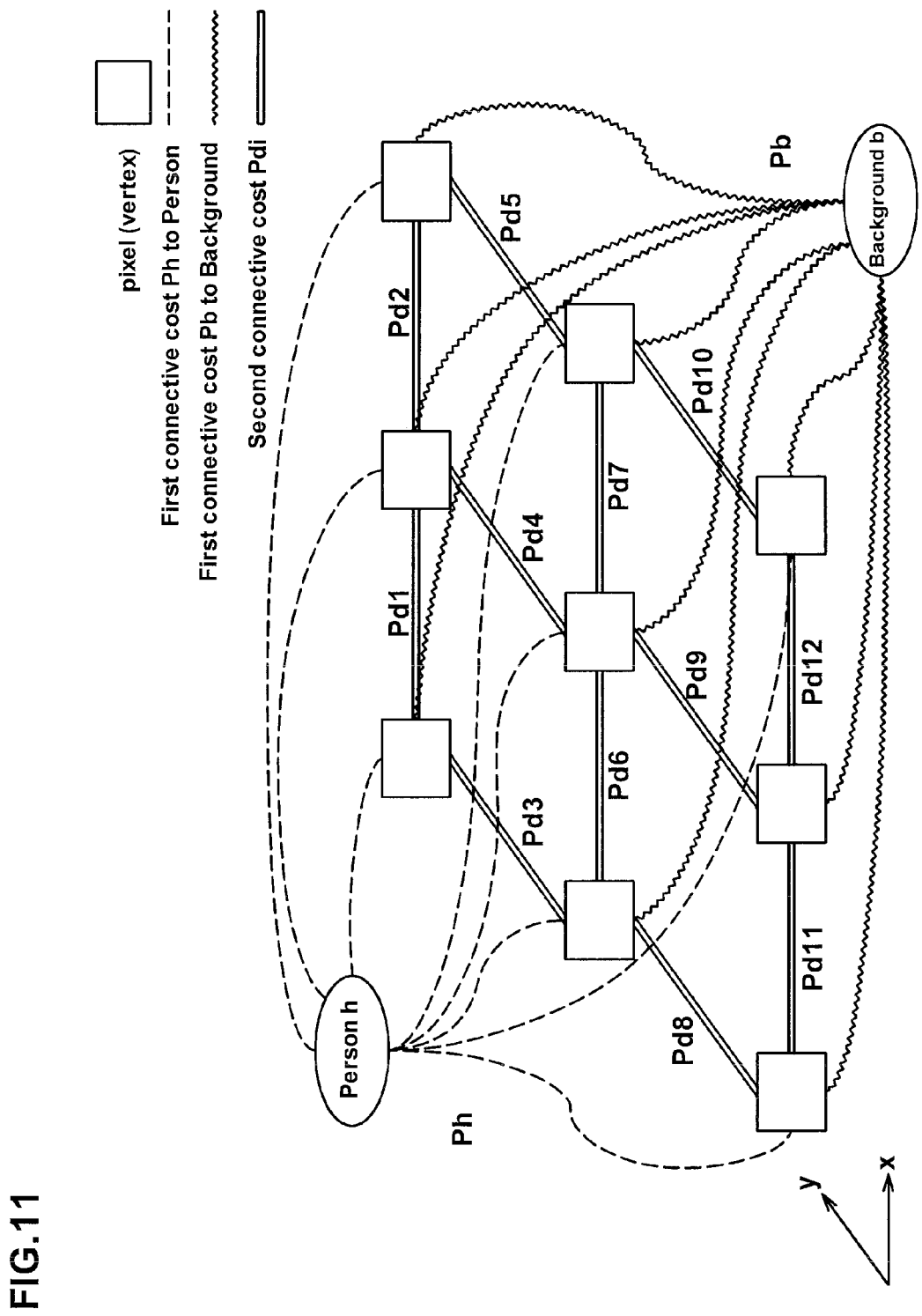
Figure 12:
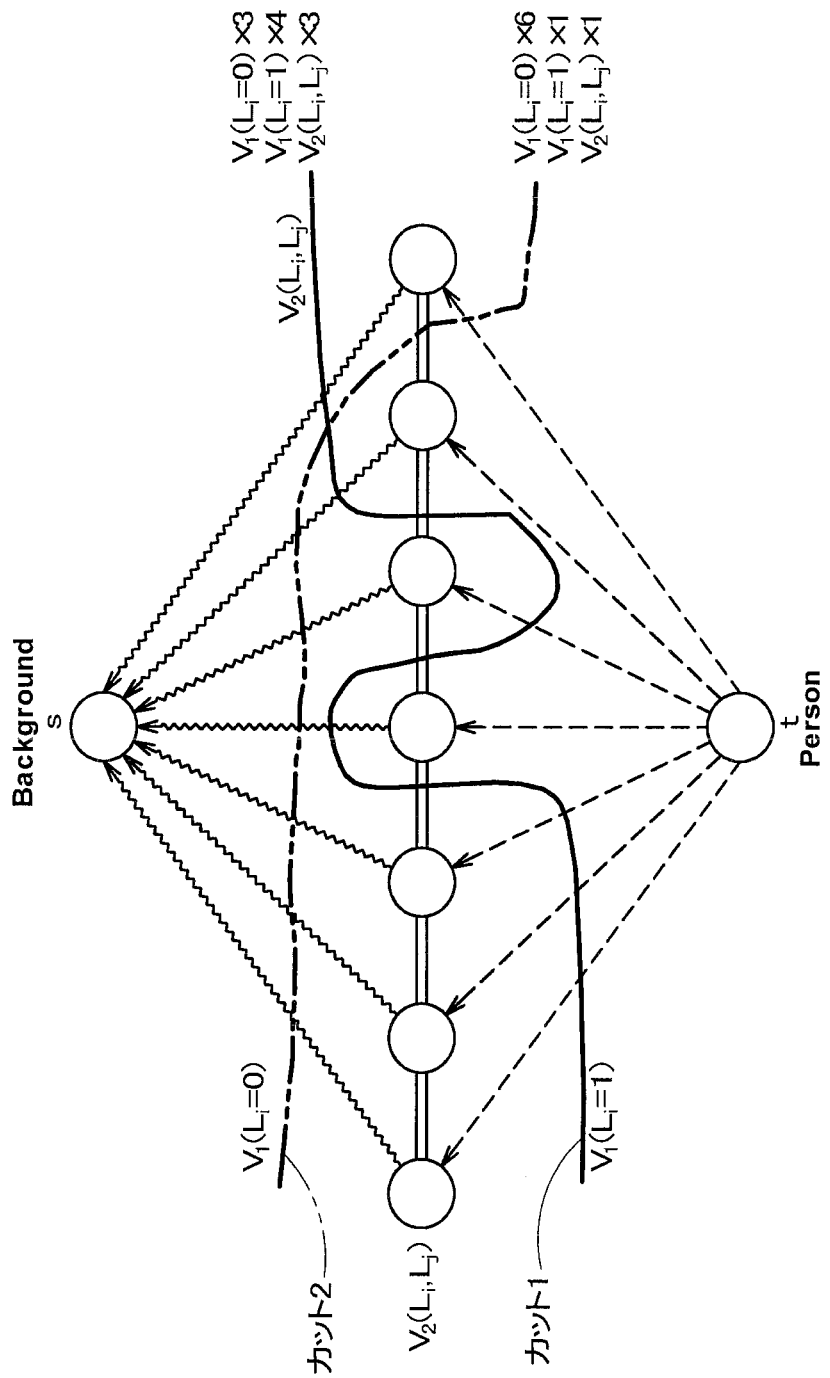

FIG. 11 shows an example of the graph for a 3×3 subset of the whole pixels, and FIG. 12 shows the flow diagram (network diagram) thereof.

In FIG. 11, the pixels are indicated by square cells which mean vertices in the graph.

These pixels as vertices are connected by the first connective costs Ph (broken lines) to the color data of the person calculated by the use of the person histogram, the first connective costs Pb (zigzag lines) to the color data of the background calculated by the use of the background histogram, and the second connective costs Pd (double lines) representing the continuity from the adjacent pixels.

Thus, the connective costs Ph, Pb and Pd correspond to "edges" connecting the vertices in the graph.

That is, the graph is created on the basis of the pixels as vertices and the connective costs Ph, Pb and Pd as edges.

Further, with respect to the graph, the correcting section 2e calculates a cut by which the sum of the connective costs Ph, Pb and Pd becomes minimum, and based on such minimum-cut, the correcting section 2e performs labeling of the pixels in the target region.—step S8

A cut (S, T) is to divide the graph (entire set of vertices s) into two subsets:

a subset of vertices as source (t) (for example, a group of pixels labeled as the person); and a subset of vertices as sink (s) (for example, a group of pixels labeled as the background).

The sum of flow passing through the cut (S, T) from the vertices as source (t) to the vertices as sink (s) is called capacity of the cut. In the case of a cut whose capacity is minimum, the capacity corresponds to the maximum flow. This is the max-flow min-cut theorem in an optimizing problem in a flow network.

In this embodiment, an energy function E(L) such as the following expression is defined, and a flow in which the energy function becomes minimum is computed:

$$E(L) = \Sigma Ph_i + \Sigma Pb_j + \Sigma Pd_{(m,n)}$$

wherein $Ph_i$: the first connective cost of a vertex (i) to the color data of the person, $Pb_j$: the first connective cost of a vertex (j) to the color data of the background, i, j∈p and i≠j, P: the entire set of the vertices s, $Pd_{(m,n)}$: the second connective cost between the pixels as vertices m and n, m, n∈P and m≠n (Pd is not always cut in every combination).

In order to explain the above-mentioned energy function, a flow diagram prepared by simplifying the graph is shown in FIG. 12, wherein a cut 1 (solid line) crosses three edges Vi(Li=0), four edges Vi(Li=1) and three edges V2(Li, Lj), and a cut 2 (chain double-dashed line) crosses six edges Vi(Li=0), one edge Vi(Li=1) and one edge Vi(Li, 0).

The edges are assigned with connective costs.

In this example, the edge Vi(Li=1) is assigned with the first connective cost Ph to the person, the edge Vi(Li=0) is assigned with the first connective cost Pb to the background, and the edge Vi(Li, Lj) is assigned with the second connective cost Pd.

Accordingly, the values of the energy function for the cut 1 and cut 2 depend on the values of the connective costs of the edges Vi(Li=0), Vi(Li=1) and Vi(Li, Lj).

In the present invention, a cut (min-cut) in which the value of the energy function becomes minimum is calculated or obtained by the use of the max-flow min-cut algorithm.

When the min-cut has been obtained from the graph, with respect to the target region, the border between the pixels labeled as the person and the pixels labeled as the background can be defined or created.

More specifically, in the step S8, a pixel whose degree of similarity to the color data of the person is low and whose continuity from the adjacent pixels is less, is defined as the source (t) of the cut and a pixel whose degree of similarity to the color data of the background is low and whose continuity from the adjacent pixels is less, is defined as the sink (s) of the cut.

Next, based on the min-cut, the correcting section 2e executes relabeling of the pixels as follows.

The pixels defined as sink (s) (background) are relabeled as the background.—step S9

The pixels defined as source (t) (person) are relabeled as the person.—Step S10

Therefore, the pixels in the target region are relabeled and the silhouette is corrected.

Next, the correcting section 2e performs final processing.—Step S11

Figure 13:
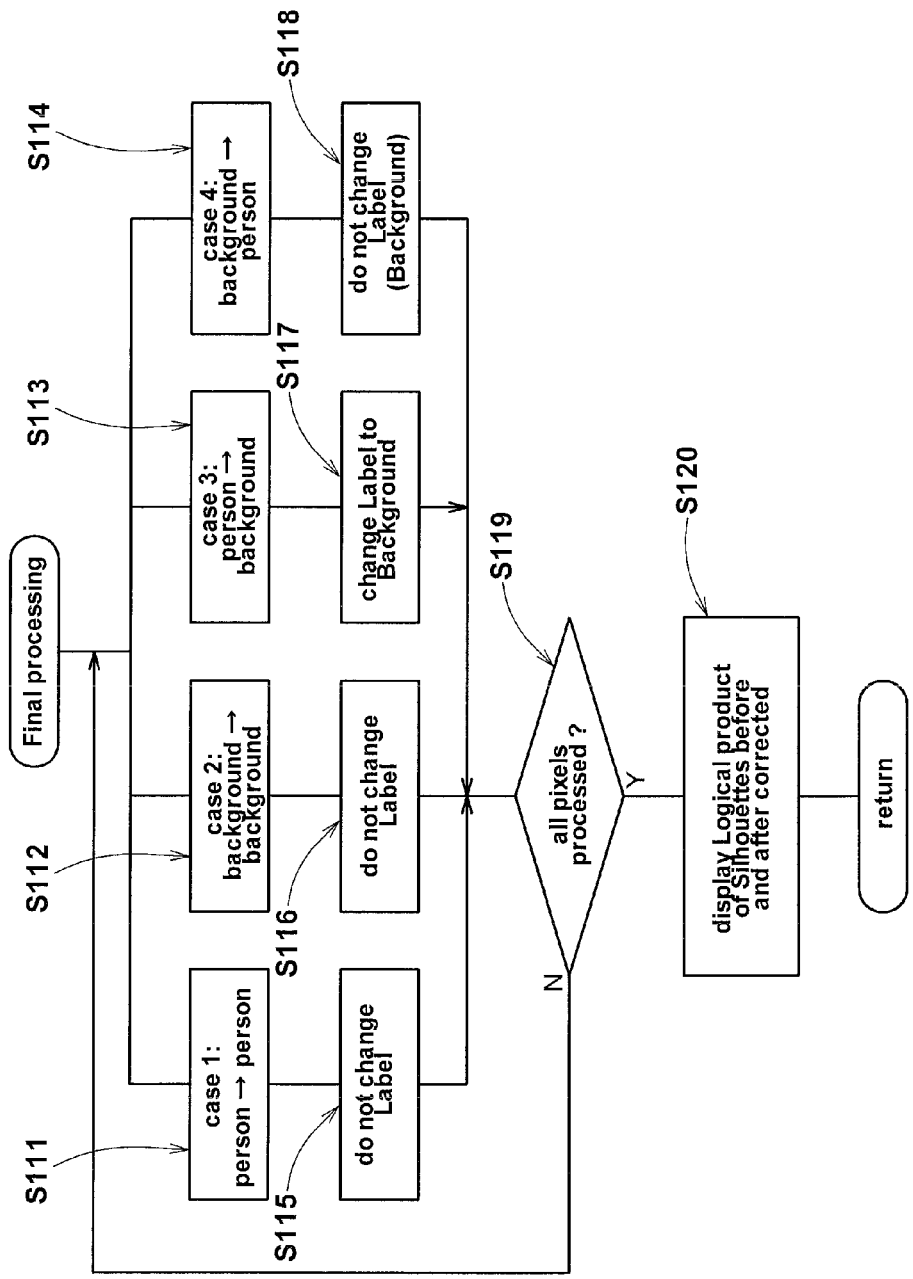

FIG. 13 shows a flowchart of an example of the final processing.

In this example, with respect to each of the pixels, the label after the correcting step is compares with the label before the correcting step to check which one of the following cases is applicable.—steps S111-S114 case 1: before=person, after =person
case 2: before=background, after =background
case 3: before=person, after =background
case 4: before=background, after =person If the case 1 or 2 is applicable (step S111,S112), then the correcting section 2e does not change the label of the concerned pixel (steps S115 and 116).

If the case 3 is applicable (step S113), then the correcting section 2e changes the label of the concerned pixel from the person to the background (step S117).

If the case 4 is applicable (step S114), then the correcting section 2e does not change the label of the concerned pixel from the background to the person (step S118).

In the preprocessing in this embodiment, as explained in the patent document 1, based on pixels of an unmasked area which is outside a masked area wide enough to cover the human body (therefore the unmasked area is surely considered as the background), pixels in the masked area which have data similar to data of the pixels of the unmasked area are labeled as "the background".

Accordingly, in the preprocessing, the accuracy of the labeling as the background is higher than the labeling as the person because the masked area is wide enough.

Therefore, in this embodiment, trusting the labeling as the background made in the preprocessing, even if the pixels labeled as the background in the preprocessing are labeled as the person in the correcting step, the labeling is not changed really in the correcting step, Next, the correcting section 2e judges if the processing of all of the pixels has been done.—step S119

If no, the correcting section 2e again executes the steps S111-118.

If yes, the correcting section 2e creates and displays an image of logical product of the silhouette of the person before corrected and the silhouette of the person after corrected.—step S120

The above-described embodiment may be modified. For example, if there are pixels relabeled as the person from the background in the correcting step, the correcting step may be performed again to accept the results thereof as the final results of the correcting step.

In this case, it is preferable that the correcting section 2e performs the correcting step with respect to only the pixels relabeled as the person such that, when calculating the first connective cost Pb to the color data of the background, the frequency $nb_{(I)}(C_{(I)(x, y)})$ is multiplied by a constant of more than 1 (in this example 2)

to increase the degree of similarity to the color data of the background, and then the first and second connective costs are calculated.

The reason for this is to increase the degree of similarity to the color data of the background in order to pay regard to the reliability of the preprocessing.

\* Comparison Tests Relating to Silhouette Correction Method

EXAMPLE 1

FIG. 14 to FIG. 15

Figure 14:

FIG. 14 is an original frame (640×320 pixels) including a person at the time of impact and the background, which is originally a color image.

Figure 15B:
FIGS. 15A and 15B show silhouettes of the person extracted from the image of FIG. 14, before corrected and after corrected, respectively.
Figure 15A:
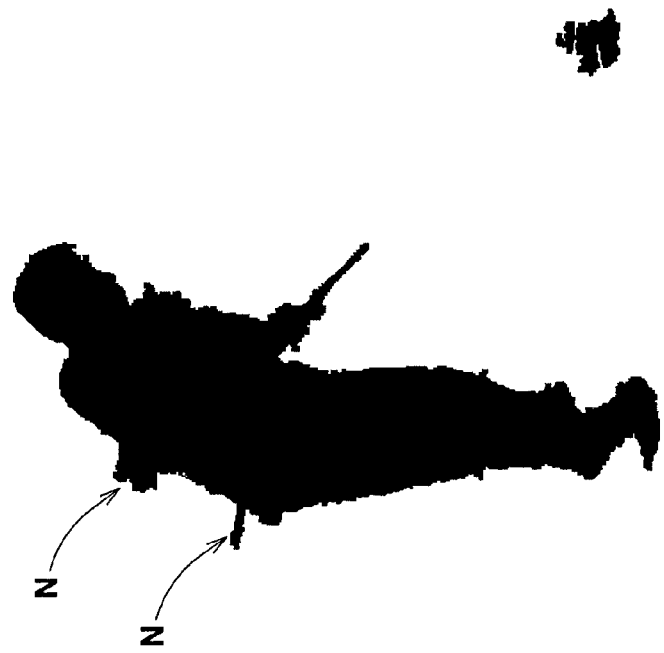

FIG. 15(a) is the silhouette of the person extracted by the preprocessing disclosed in the patent document 1, wherein part of the background near the back and waist of the person are incorrectly labeled as the person. Thus, there is noise N.

FIG. 15(b) is the silhouette shown in FIG. 15(a) corrected by the silhouette correction method according to the present invention. As shown, the noise was completely removed.

EXAMPLE 2

FIG. 16 to FIG. 17

Figure 16:
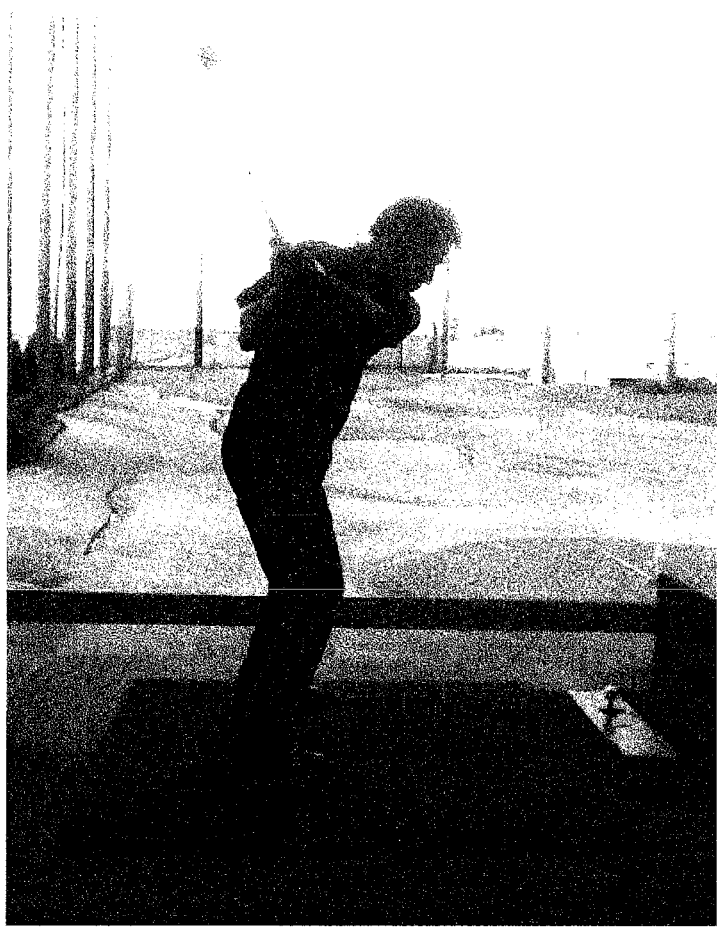

FIG. 16 is an original frame (640×320 pixels) including a person making a swing back and the background.

Figure 17A:
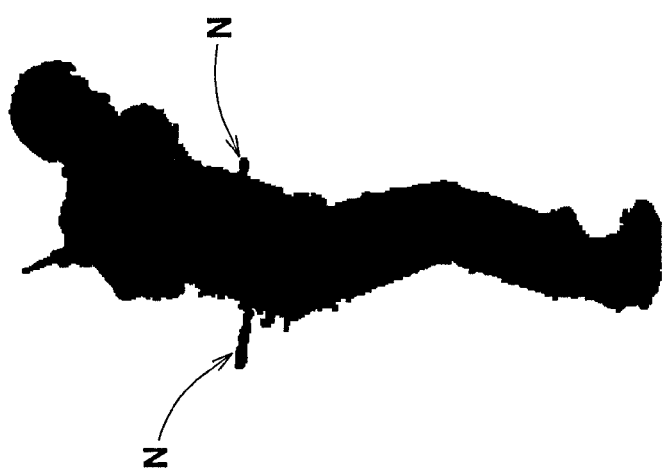

FIG. 17(a) is the silhouette of the person extracted by the preprocessing disclosed in the patent document 1, wherein part of the background near the back and abdomen of the person are incorrectly labeled as the person. Thus, there is noise N.

Figure 17B:

FIG. 17(*b*) is the silhouette shown in FIG. 17(*a*) corrected by the silhouette correction method according to the present invention. As shown, the noise was completely removed.

\* Embodiments Relating to Silhouette Extraction Method and System

Next, with regard to the method and system for extracting a silhouette of a person from a plurality of frames captured from a moving image of the person swing a golf club, embodiments of the present invention will be described in detail in conjunction with FIG. 18-FIG. 52.

Figure 18:
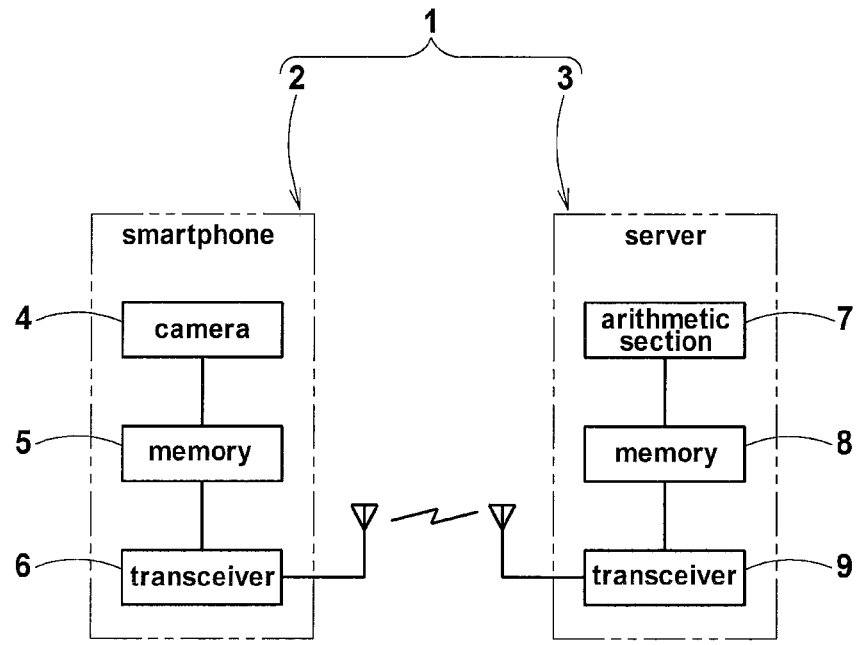

FIG. 18 is a block diagram showing a silhouette extraction system 1 for performing a silhouette extraction method according to the present invention.

The system in this embodiment comprises a smartphone 2, a server 3, and a communicating system connecting between the smartphone 2 and the server 3. The communicating system is essentially a means of wireless connection. But, wired connection may be included.

The smartphone 2 includes a camera 4, a memory 5 and a transceiver 6. The camera 4 can take moving image. The memory 5 may include RAM, SD card (mini-SD card, micro SD card) and other storage media.

The server 3 includes an arithmetic section 7, a memory 8 and a transceiver 9.

Figure 19:
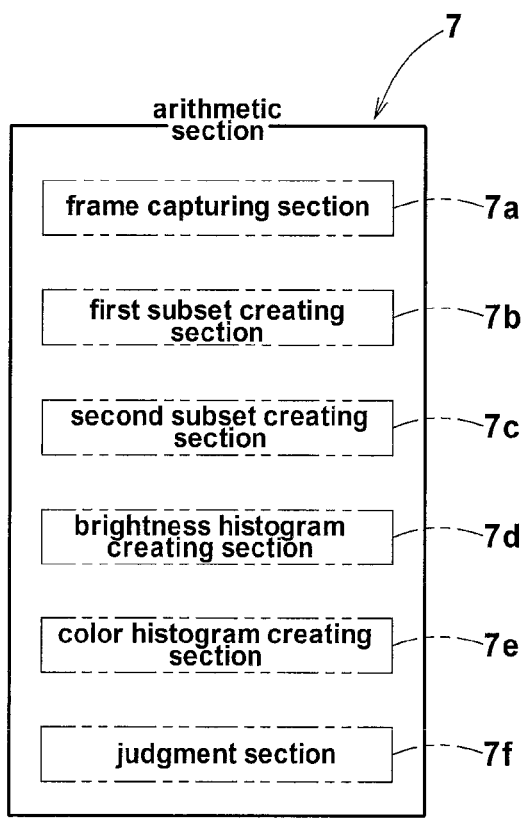

As to the arithmetic section 7, for example CPU is used, The arithmetic section 7 includes, as shown in FIG. 19, a frame capturing section 7*a*, a first subset creating section 7*b*, a second subset creating section 7*c*, a brightness histogram creating section 7*d*, a color histogram creating section 7*e* and a judgment section 7*f*.

Figure 20:
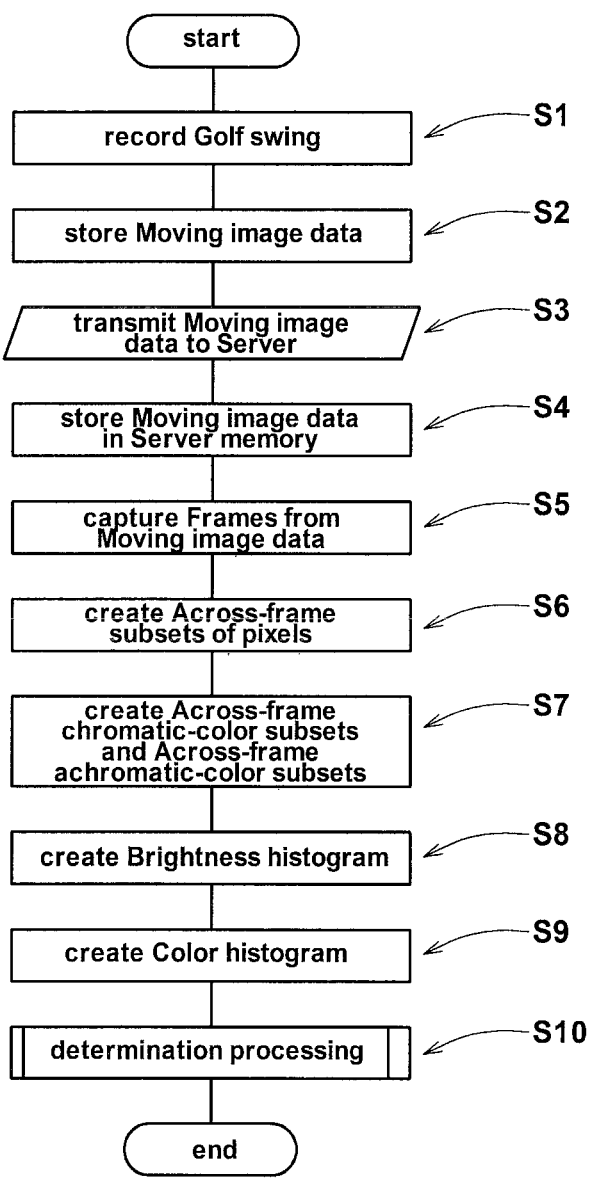

FIG. 20 shows a flowchart of the silhouette extraction method executed by the system 1 in this embodiment.

In this embodiment, firstly, golf swing is recorded with the camera 4.—Step S1

The golf swing is a sequence of actions of a person with a golf club which in this application, include address, take back, top of backswing, downswing, impact, and follow through.

Figure 21:
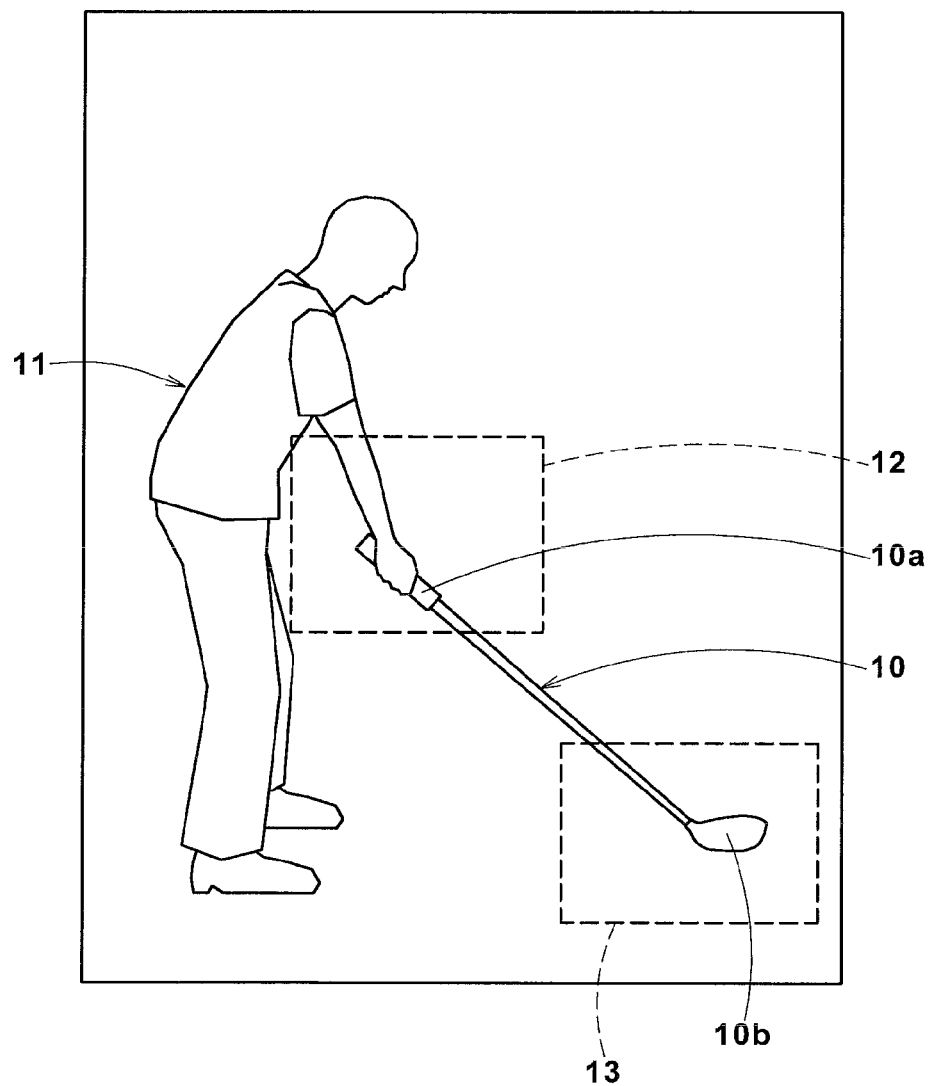

FIG. 21 shows the display of the smartphone 2 which displays an image at the start of recording with the camera 4. In this image, the person 11 with a golf club 10 addressing the ball is shown as viewed from behind.

In a preferred embodiment, the software executed by the arithmetic section of the smartphone 2 can display a first guide frame 12 and a second guide frame 13 in the display of the smartphone 2. Thus, the recording person can adjust the framing of the camera 4 so that the grip 10*a* of the golf club 10 is included in the first guide frame 12, and the club head 10*b* is included in the second guide frame 13. Thus, the frames 12 and 13 help to decide the distance between the camera 4 and the person 11, the camera angle and the picture composition.

The recording of the moving image is started from an address state of the person as shown in FIG. 21.

When the recording is started, the person 11 starts to swing. The recording is continued until the finish of the swing. The moving image data is stored in the memory 5.—step S2

In this example, the number of pixels of the moving image is 640×320 (vertical×horizontal).

According to an operation of the smartphone 2 by the user, the recorded moving image data is transmitted from the transceiver 6 of the smartphone 2 to the transceiver 9 of the server 3 (step S3) and stored in the memory 8 of the server 3 (step S4).

Next, the frame capturing section 7*a* captures a plurality of still frames from the moving image data.—step S5

The number of the frames per second is 30 or 60. For example, from the moving image data of 3 seconds whose frame number is 30/sec, 90 frames (30×3) are captured. Incidentally, if needed, a correct processing such as image stabilization may be made on each of the frames.

Next, with respect to each of the positions of pixels in a frame (in this example there are 640×320=204800 positions), the first subset creating section 7*b* creates an across-frame subset which is a subset of the pixels of all of the frames at the concerned position.—step S6

In this example, the number of the frames is 90. Therefore, the across-frame subset includes 90 pixels. The number of the across-frame subsets is 204800 (=640×320).

Next, with respect to each of the positions of pixels in a frame (as explained, in this example there are 204800 positions), the second subset creating section 7*c* determines, for each of the pixels of all of the frames at the concerned position, whether the color of the pixel is achromatic or chromatic, and creates an across-frame chromatic-color subset and an across-frame achromatic-color subset.—step S7

Therefore, an across-frame subset includes an across-frame chromatic-color subset and an across-frame achromatic-color subset.

In this example, the number of the across-frame chromatic-color subsets and the number of the across-frame achromatic-color subset are 204800.

With respect to each of the across-frame subsets, the brightness histogram creating section 7*d* creates a brightness histogram (first histogram).—step S8

Figure 22A:
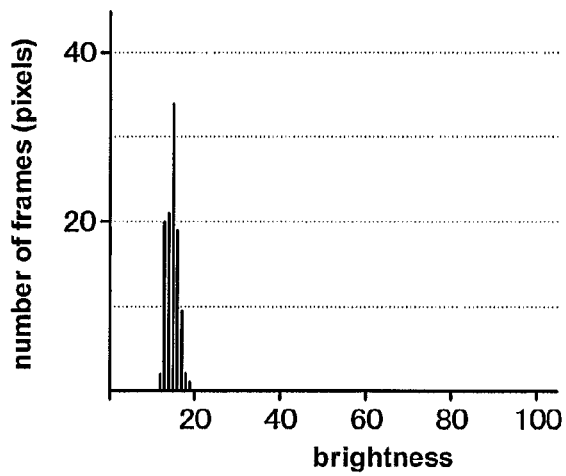
FIGS. 22A, 22B, and 23C show brightness histograms of pixels of across-frame subsets.
Figure 22B:
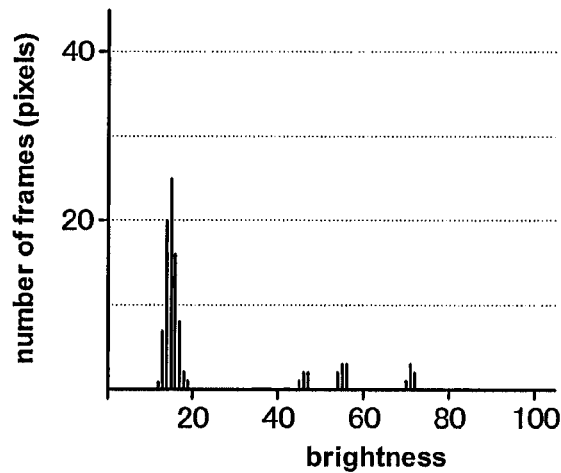
Figure 22C:
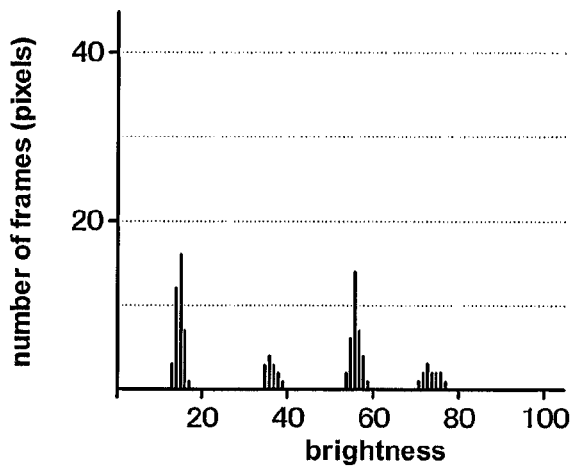

In the brightness histogram, the class is the brightness (color data) and the frequency is the number of the frames (pixels) as shown in FIGS. 22(*a*)-22(*c*).

It is also possible to create the brightness histogram based on the color data other than the brightness.

The brightness histogram may be subjected to a smoothing processing.

With respect to the across-frame chromatic-color subset and the across-frame achromatic-color subset at each of the foregoing positions, the color histogram creating section 7*e* creates a color histogram (second histogram) (step S9).

Figure 23A:
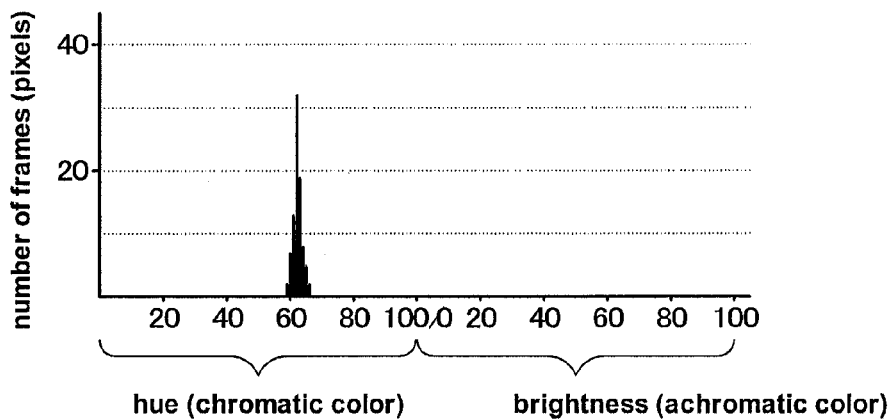
Figure 23B:
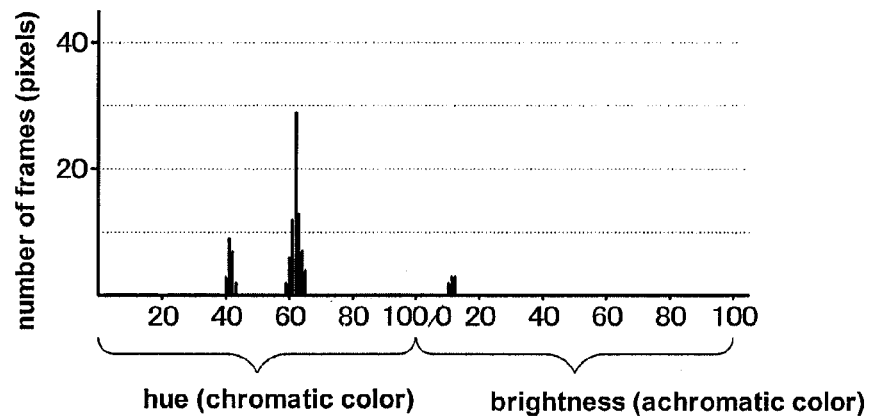
Figure 23C:
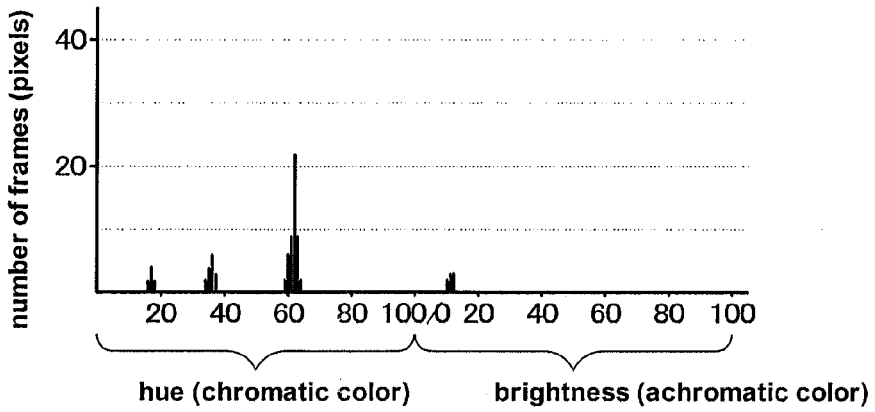

As shown in FIG. 23(*a*)-23(*c*), in the color histogram, the frequency is the number of the frames (pixels), and the class relating to the across-frame chromatic-color subset is the hue (color data), and the class relating to the across-frame achromatic-color subset is the brightness (color data).

It is also possible that the class relating to the across-frame chromatic-color subset is color data other than the hue, and the class relating to the across-frame achromatic-color subset is color data other than the brightness.

With respect to each pixel in each of the across-frame subsets, the judgment section 7*f* performs determination processing (labeling) to determine whether the concerned pixel is of the background or the person, using the above-mentioned data.—step S10

Figure 24:
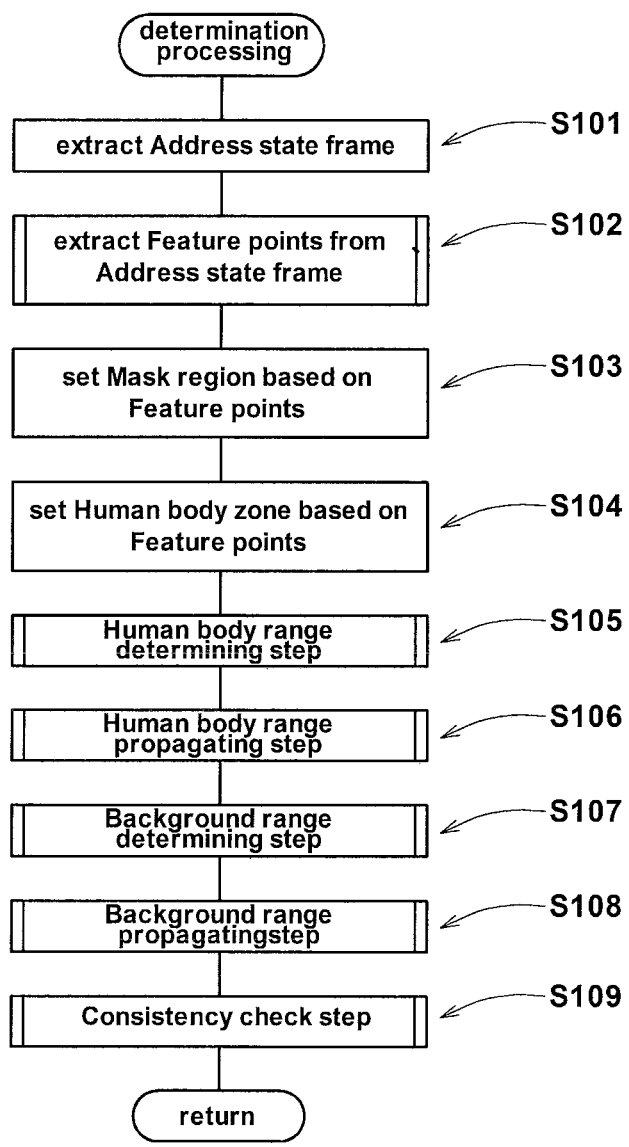

FIG. 24 shows a flowchart of an example of the determination processing.

In the determination processing in this example, firstly, an address state frame including the address state of the person 11 is extracted from the frames of the moving image by the address state frame extracting section of the judgment section 7*f*.—step S101 when the recording was started from the address state, for example, a first frame may be extracted as the address state frame.

In the address state frame, the person 11 and the golf club 10 are included as shown in FIG. 21.

[Feature-Point Extracting Step]

Next, the feature point extracting section of the judgment section 7f performs a feature point extracting step S102.

In this step, the address state frame is subjected to an image processing to extract predetermined feature points at plural positions of the person 11 and the golf club 10.

Figure 25:
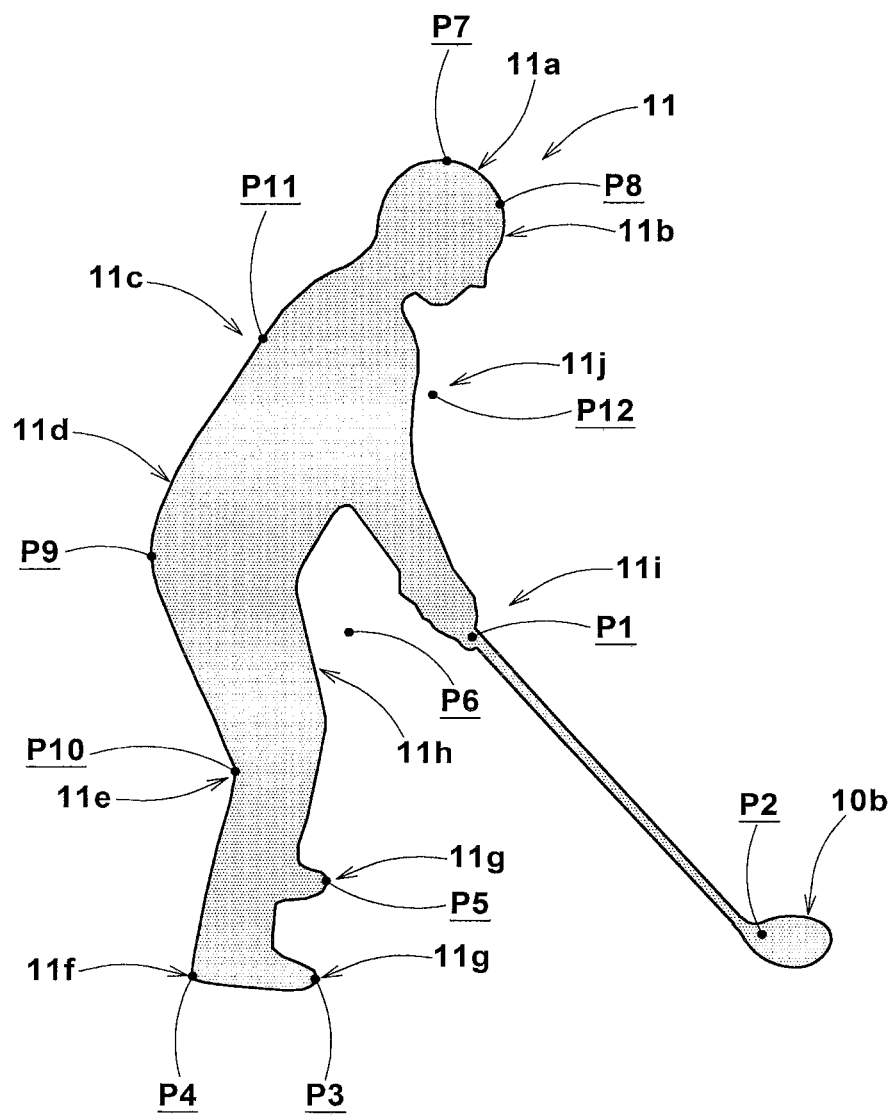

As shown in FIG. 25, the feature points in this example include feature points P1-P12 corresponding to the positions representing the top of head 11a, forehead 11b, back 11c, waist 11d, back of knee 11e, heel 11f, toe 11g, thigh 11h, hand 11i and shoulder 11j of the human body 11 in the address state, and the club head 10b of the golf club.

On the assumption that a person (golfer) addressing the ball presents a substantially fixed posture, the feature points P1-P12 can be extracted by computing the data obtained by the image processing as described below.

[Feature-Point P1(x1, y1) of Hand]

The judgment section 7f computes the difference between the address state frame and a top-of-backswing frame including the top of backswing to obtain a difference image as the result of the computation.

Figure 26:
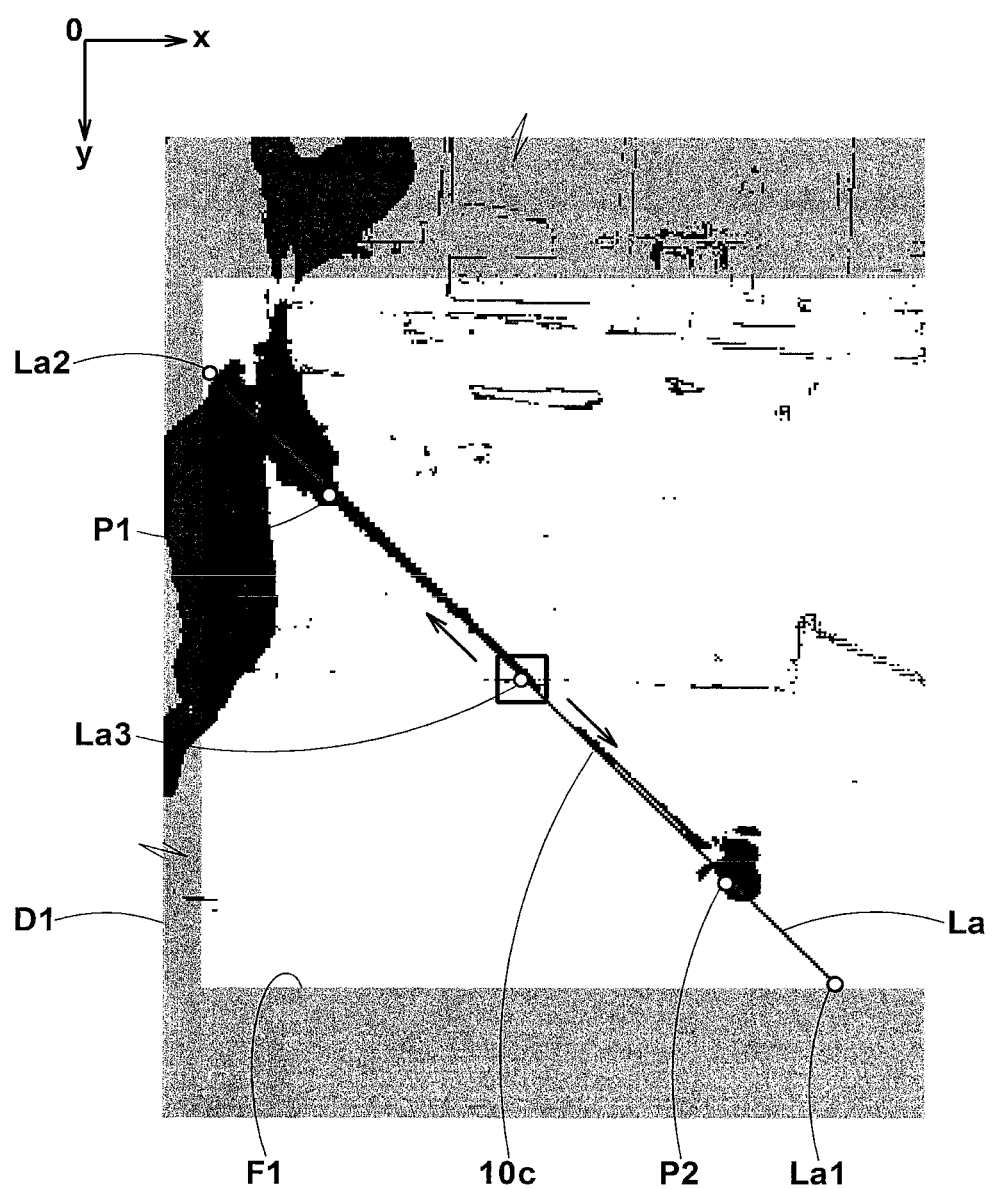

The binarized image D1 of such difference image is shown in FIG. 26, wherein the part indicated in black corresponds to the difference pixels.

Owing to the difference between the two frames respectively including the states which are considered as being extremely opposite to each other, the hands and the golf club 10 in the address state appear clearly on the binarized image D1 as shown in FIG. 26.

Next, the judgment section 7f sets a searching region F1 in the difference image D1.

The searching region F1 is shown with white background in FIG. 26, and its ranges of the x and y-coordinates are set as follows.

$$200 = < x = < 480,$$

$$250 = < y = < 530.$$

These ranges were determined based on the picture composition so that the searching region F1 is surely expected to include the hands of the person and the club head.

However, it is of course possible to set the searching region F1 at a different position, depending on the picture composition.

Next, the judgment section 7f extracts a straight line (La) from the golf club shaft 10c by making a Hough transformation of the searching region F1 of the difference image D1. The both ends (La1 and La2) of the extracted straight line (La) are therefore positioned on the border of the searching region F1.

Further, the judgment section 7f set a rectangular region at the midpoint La3 of the straight line (La) and moves the rectangular region toward the upper left along the straight line (La).

When the difference image number on the rectangular region becomes not less than a predetermined fixed value at a certain position on the straight line (La), the judgment section 7f extracts this position as the feature point P1 of the hand.

This processing is based on the experimental rule that, when the person in the address state is viewed behind, on the upper end side of the shaft 10c, there is a bulging part due to the hands of the person, namely there are the hands.

[Feature-Point P2(x2, y2) of Club Head]

Further, the judgment section 7f moves the rectangular region toward the lower right along the straight line (La) as shown in FIG. 26.

When the difference image number on the rectangular region becomes not less than a predetermined fixed value at a certain position on the straight line (La), the judgment section 7f extracts this position as the feature point P2 of the club head of the golf club.

This processing is based on the experimental rule that, when the person with the golf club in the address state is viewed behind, on the lower end side of the shaft 10c, there is a bulging part due to the club head, namely there is the club head.

[Feature-Point P3(X3, Y3) of Right Foot Toe and Feature-Point P4(X4, Y4) of Right Foot Heel]

Figure 27:
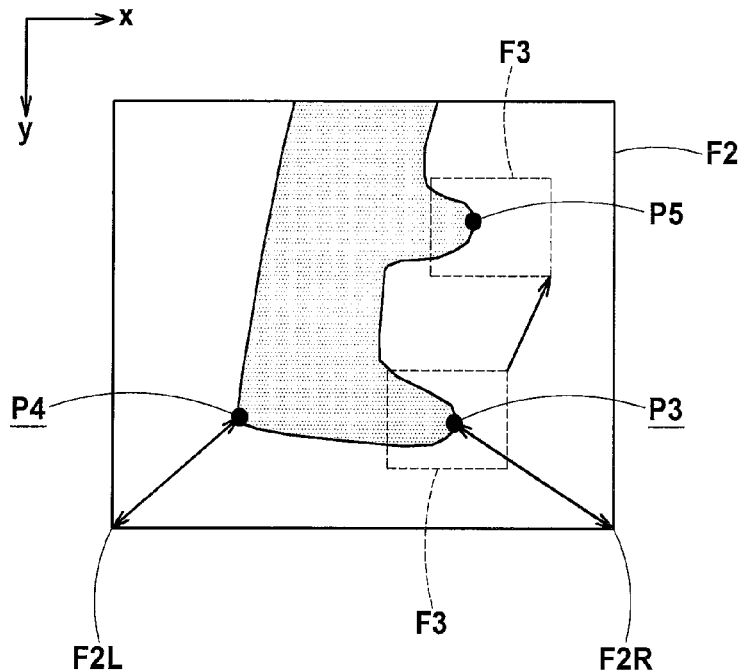

FIG. 27 shows a simplified binarized image of the address state frame, wherein the shaded part indicates an approximate silhouette of the person 11.

As shown in FIG. 27, the judgment section 7f sets a searching region F2 in the binarized image.

The searching region F2 is a region surely expected to include the right foot heel and toe, and determined in advance based on the picture composition.

The judgment section 7f extracts a black pixel which is nearest from the lower left corner F2L of the searching region F2 as the feature point P4 of the right foot heel.

Further, the judgment section 7f extracts a black pixel which is nearest from the lower right corner F2R of the searching region F2 as the feature point P3 of the right foot toe.

This processing is based on the experimental rule that, when the feet of the person in the address state is viewed behind, the rightward end is a toe, and the leftward end is a heel.

[Feature-Point P5(x5, y5) of Left Foot Toe]

Using the foregoing feature point P3 of the right foot toe, the judgment section 7f extracts the feature point P5 of the left foot toe.

Specifically, as shown in FIG. 27, the judgment section 7f sets a reference region F3 surrounding the feature point P3 of the right foot toe.

Then, taking this reference region F3 as template, the most matching region is computed or obtained.

This processing is based on the experimental rule that, when the feet of the person in the address state is viewed behind, the right foot toe and the left foot toe have similar shapes.

In the address state frame, the left foot toe is located above and near the right foot toe. It is therefore preferable that the range to be searched for the most matching region is limited according thereto.

[Feature-Point P6(x6, y6) of Thigh]

Figure 28:
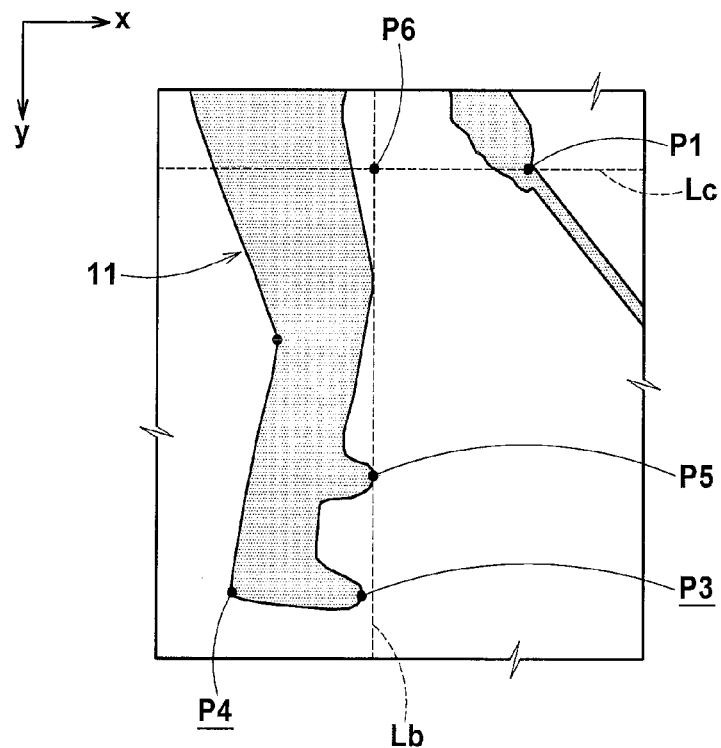

FIG. 28 shows a simplified binarized image of the address state frame.

The judgment section 7f computes the intersecting point of a straight line (Lb) passing through the feature point P5 of the left foot toe in parallel with the y-axis and a straight line (Lc) passing through the feature point P1 of the hand in parallel with the x-axis, and the judgment section 7f extracts this point as the feature point P6 of the thigh.

This processing is based on the experimental rule that, when the person in the address state is viewed behind, the front side of the thigh of the person is located near the above-mentioned intersecting point.

[Feature-Point P7(x7, y7) of Top of Head]

The judgment section 7f computes the difference between the address state frame and an impact-state frame including the person in the impact state.

Figure 29:
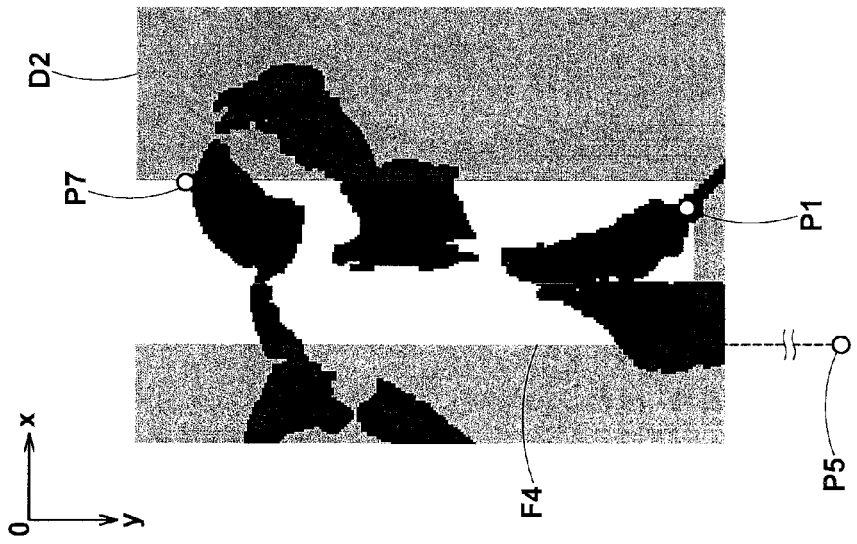

FIG. 29 shows a binarized image D2 of the computed difference.

Next, the judgment section 7f sets a searching region F4 in the binarized image D2.

This searching region F4 is shown with white background in FIG. 29, and its ranges of the x and y-coordinates are set as follows:

$$x5-15\ \text{pixels} = < x = < x1+10\ \text{pixels}$$

$$10 = < y = < y1$$

wherein
x1: the x-coordinate of the feature point P1 of the hand.
x5: the x-coordinate of the feature point P5 of the left foot toe, and
y1: the y-coordinate of the feature point P1 of the hand.

This searching region F4 is determined in advance based on the picture composition.

Next, the judgment section 7f locates one of the difference pixels existing in the searching region F4 which is uppermost, namely, the pixel whose y-coordinate is smallest in the X-Y coordinate system in this example, and then the judgment section 7f extracts the position of this pixel as the feature point P7 of the top of head, This processing is based on the experimental rule that, when the person in the address state and impact state is viewed behind, the head of the person is located in substantially same positions, therefore, the pixel having the smallest y-coordinate value in either state can be considered as the top of head.

[Feature-Point P8(x8, y8) of Forehead]

The judgment section 7f computes the difference between the address state frame and a finish-state frame including the person in the finish state.

Figure 30:
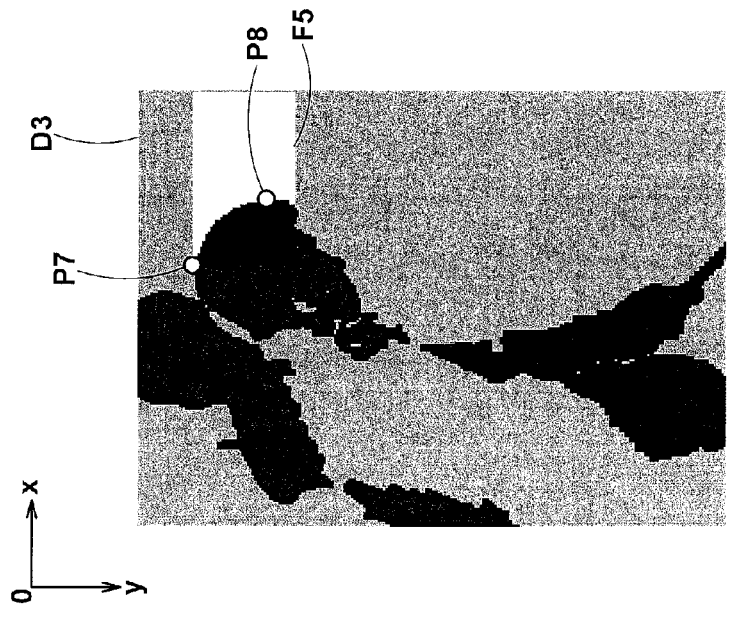

FIG. 30 shows the binarized image D3 of the computed difference.

Next, the judgment section 7f sets a searching region F5 in the binarized image.

The searching region F5 is shown with white background in FIG. 30, and its ranges of the x and y-coordinates are set as follows:

$$x7 = < x = < x7+70\ \text{pixels}$$

$$y7 = < y7+40\ \text{pixels}$$

wherein
x7: x-coordinate of the feature point P7 of the top of head, and
y7: y-coordinates of the feature point P7 of the top of head.

This searching region F5 is determined in advance based on the picture composition.

Next, the judgment section 7f locates one of the difference pixels existing in the searching region F5 which is rightmost, namely, the pixel whose x-coordinate value is largest in the x-Y coordinate system in this example, and then the judgment section 7f extracts the position of this pixel as the feature point P8 of the forehead.

This processing is based on the experimental rule that, when the person in the address state and finish state is viewed behind, the head of the person is located in substantially same positions, therefore, the pixel having the largest x-coordinate value in either state can be considered as the forehead.

[Feature-Point P9(x9, y9) of Waist]

The judgment section 7f computes the difference between the address state frame and the finish-state frame.

Figure 31:
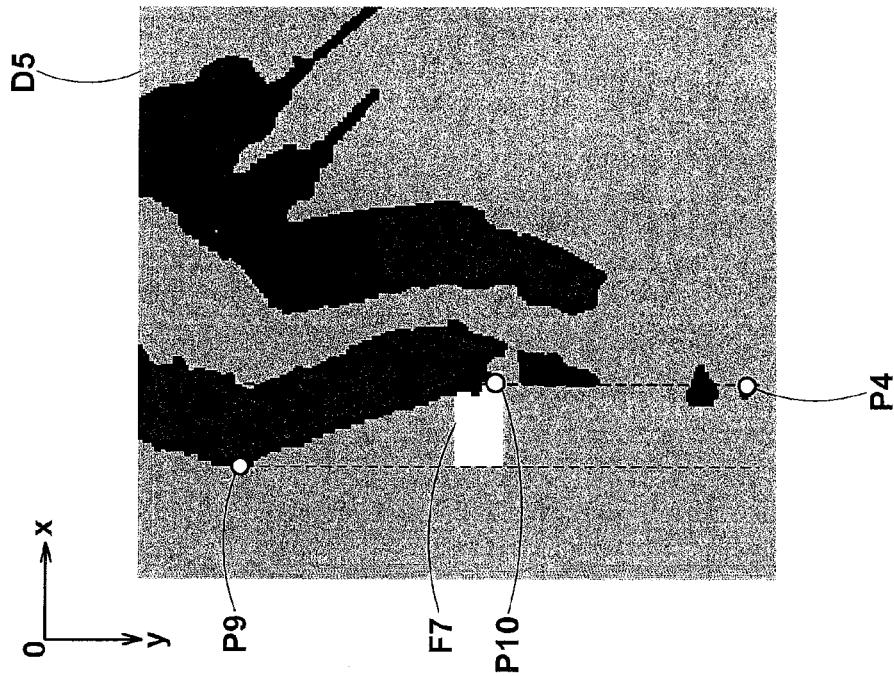

FIG. 31 shows a binarized image D4 of the computed difference.

The judgment section 7f sets a searching region F6 in the binarized image.

The searching region F6 is shown with white background in FIG. 31, and its ranges of the x and y-coordinates are set as follows:

$$x4-70\ \text{pixels} = < x = < x4+10\ \text{pixels}$$

$$y1-50\ \text{pixels} = < y1+50\ \text{pixels}$$

wherein
x4: x-coordinate of the feature point P4 of the right foot heel
y1: y-coordinate of the feature point P1 of the hand.

This searching region F6 is determined in advance based on the picture composition.

Next, the judgment section 7f locates one of the difference pixels existing in the searching region F6 which is leftmost, namely, the pixel whose x-coordinate is smallest in the X-Y coordinate system in this example, and then the judgment section 7f extracts the position of this pixel as the feature point P9 of the waist.

This processing is based on the experimental rule that, when the person in the address state and finish state is viewed behind, the waist bulges mostly, therefore, the pixel having the smallest x-coordinate value in either state can be considered as the waist

[Feature-Point P10(x10, y10) of Back of Knee]

The judgment section 7f computes the difference between the address state frame and the impact-state frame.

Figure 32:
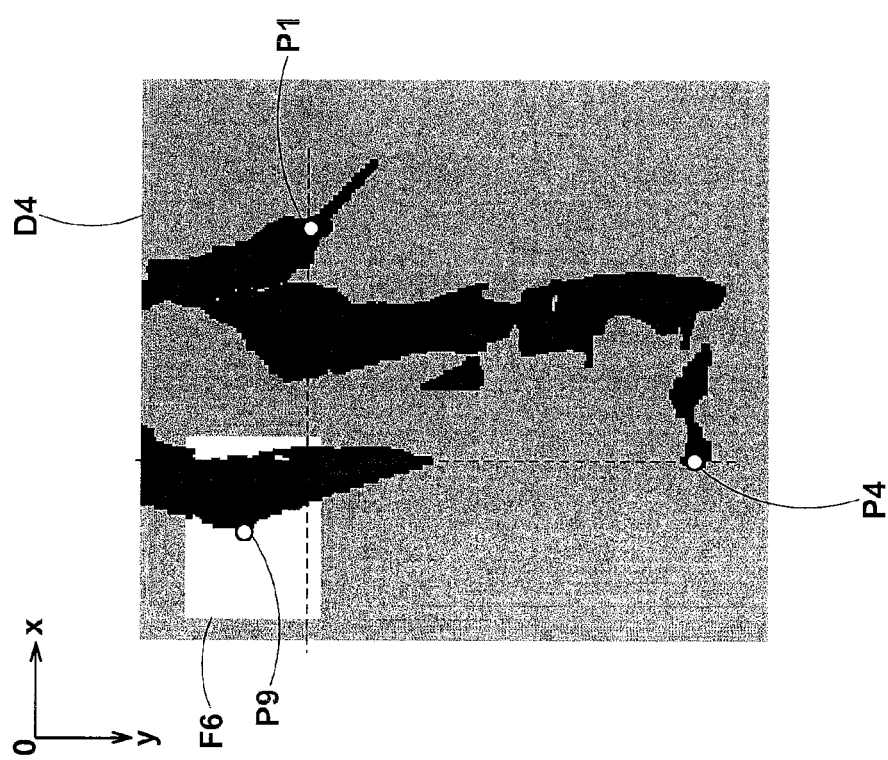

FIG. 32 shows the binarized image D5 of the computed difference.

The judgment section 7f sets a searching region F7 in the binarized image D5.

This searching region F7 is shown with white background in FIG. 32, and its ranges of the x and y-coordinates are set as follows:

$$x9 = < x = < x9+10\ \text{pixels}$$

$$0.5*(y9+y4)-10 = < y = < 0.5*(y9+y4)+10$$

wherein
x9: x-coordinate of the feature point P9 of the waist,
y4: y-coordinates of the feature point P4 of the right foot heel, and
y9: y-coordinates of the feature point P9 of the waist.

This searching region F7 is determined in advance based on the picture composition.

Next, the judgment section 7f locates one of the difference pixels existing in the searching region F7 of which x-coordinate value is largest, and then
the judgment section 7f extracts the position of this pixel as the feature point P10 of the back of knee.

This processing is based on the experimental rule that, when the person in the address state and impact state is viewed behind, the back of knee becomes concave mostly, therefore, the pixel having the largest x-coordinate value in either state can be considered as the back of knee.

[Feature-Point P11(x11, y11) of Back]

Figure 33:
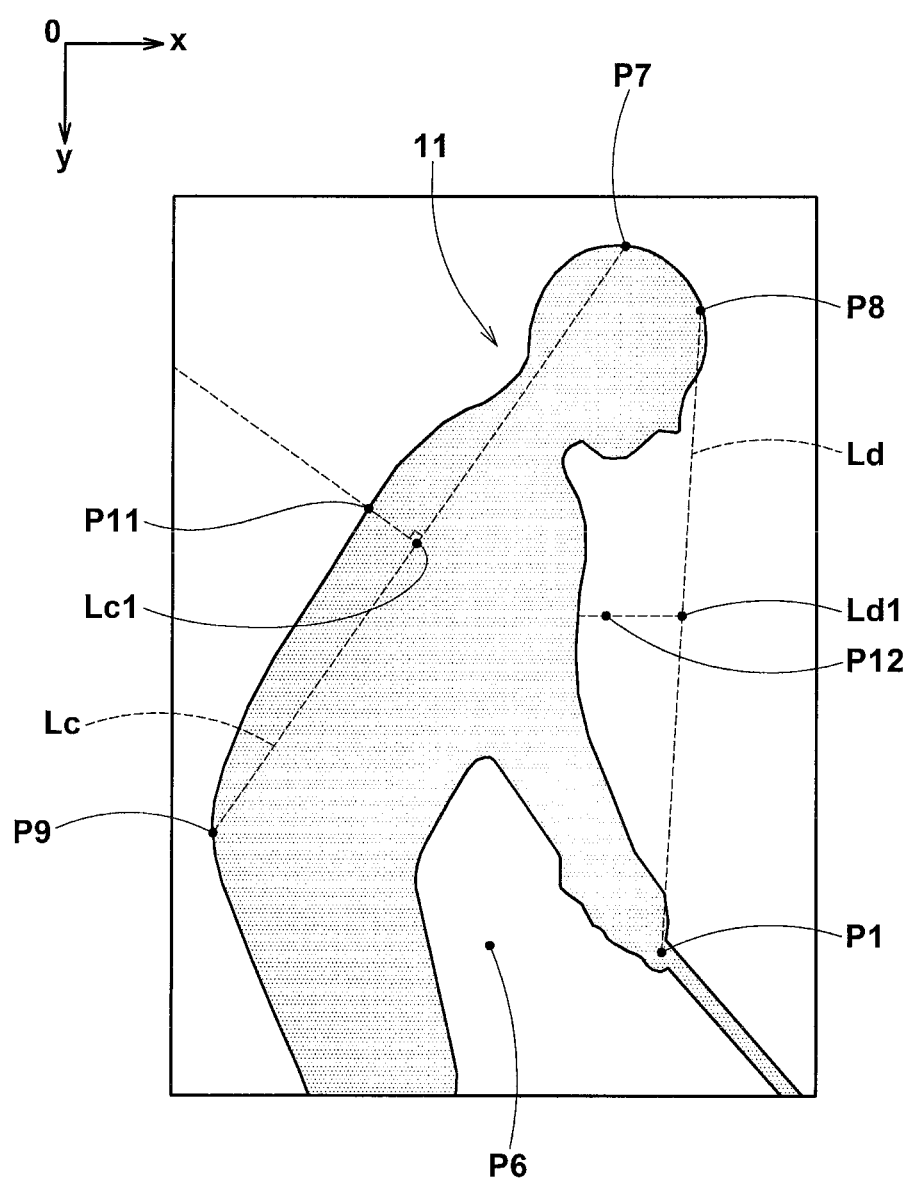

The judgment section 7f extracts, as the feature point P11 of the back, the position which is 25 pixels outside from the midpoint Lc1 of a straight line (Lc) drawn between the feature point P7 of the top of head and the feature point P9 of the waist, along the normal direction to straight line (Lc) as shown in FIG. 33.

This was empirically-defined based on the body shape of the average human body.

[Feature-Point P12(x12, y12) of Shoulder Region]

The judgment section 7f extracts, as the feature point P12 of the shoulder region, the position which is 30 pixels inside from the midpoint Ld1 of a straight line (Ld) drawn between the feature point P8 of the forehead and the feature point P1 of the hand, along the normal direction to the straight line (Ld) as shown in FIG. 33.

This was empirically-defined based on the body shape of the average human body.

[Mask Region Determining Step]

Next, based on the feature points P1-P12, the judgment section 7f set a mask region.—Step S103

Figure 34:
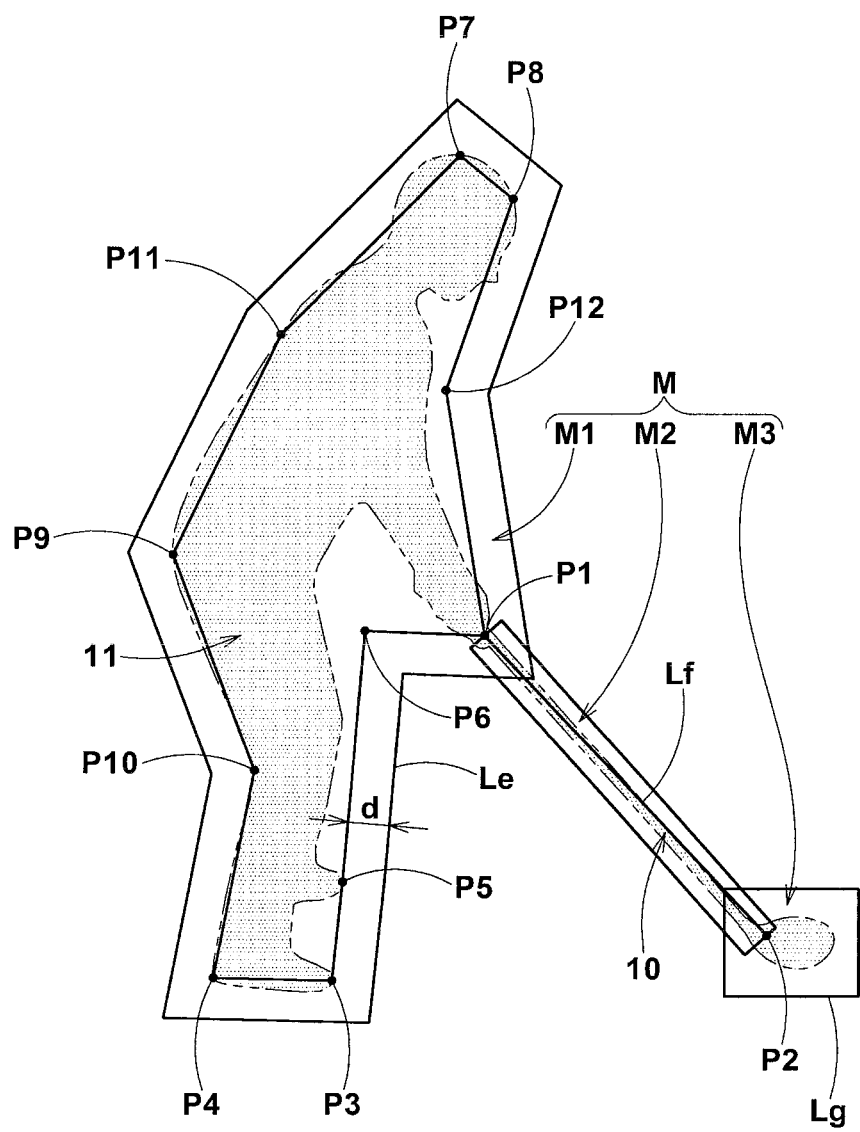

Firstly, the judgment section 7f defines a closed zone by connecting the feature points P1-P6-P5-P3-P4-P10-P9-P11-P7-P8-P12-P1 with straight line segments in this order as shown in FIG. 34.

Next, using the connected line made up of the foregoing straight line segments, the judgment section 7f sets a first mask region M1.

The first mask region M1 is a closed region formed by a line (Le) drawn outside the said connected line in parallel with the connected line to have a certain distance (d) therebetween.

Further, the judgment section 7f defines a second mask region M2. The second mask region M2 extends on both sides of a straight line drawn between the feature points P1 and P2 so as to include the golf club shaft.

Furthermore, the judgment section 7f defines a third mask region M3. The third mask region M3 is rectangular and larger than the club head and includes the feature point P2 of the club head.

Then, the judgment section 7f computes and defines a mask region M which is the logical sum of the first, second and third mask regions, and
the judgment section 7f stores the mask region M in the memory 8.

The above-mentioned distance (d) is determined so that the mask region M includes the human body 10 and the golf club 11 and a narrow part of the background surrounding the human body 10 and the golf club 11. Such distance (d) corresponds to several pixels, for example, about 10 pixels.

In this example, a preferred size of the rectangular third mask region M3 is, for example, 30 pixels in the x-axis direction and 25 pixels in the Y-axis direction.

These settings may be changed arbitrarily depending on the picture composition.

[Human Body Zone Determining Step]

Next, based on the feature points P1-P12, the human body zone setting section of the judgment section 7f performs a human body zone determining step S104.

This step S104 is to define a human body zone z.

The human body zone z is a region including only some of the pixels in the mask region M which have a high probability of constituting the silhouette of the person 11.

Figure 35:
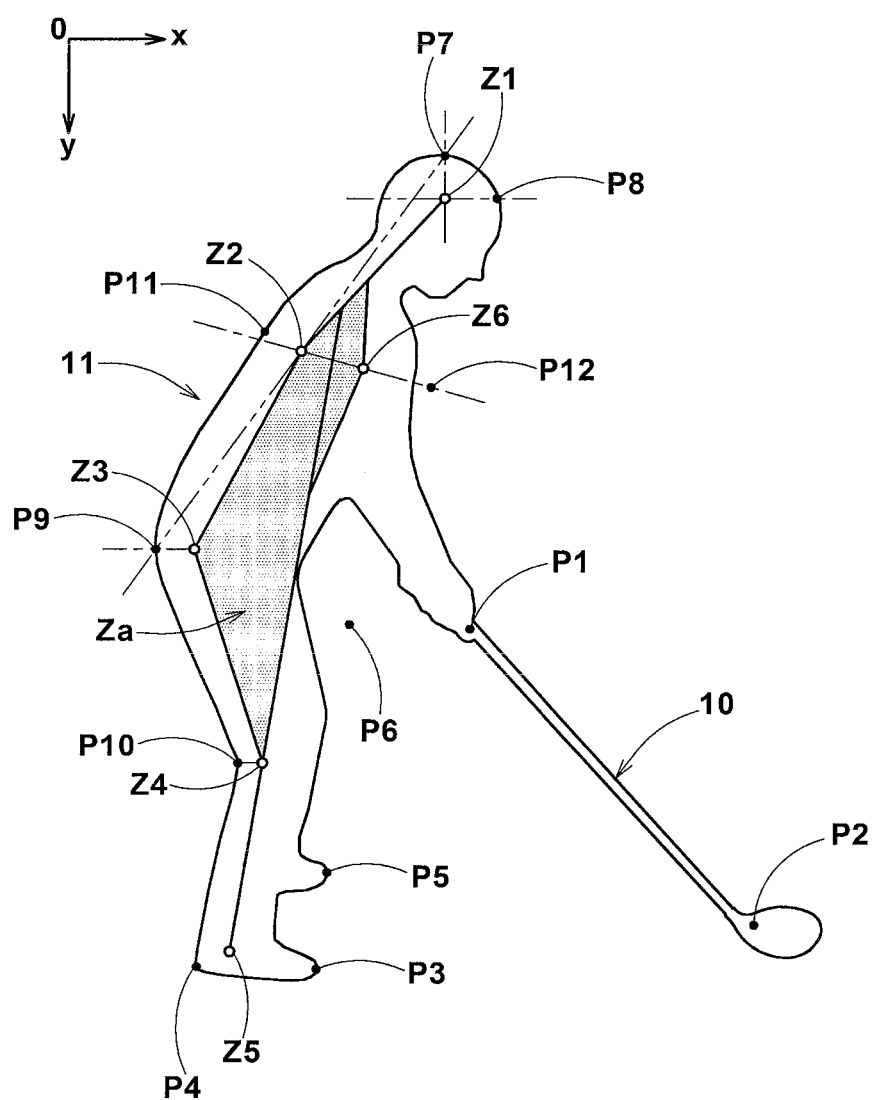

Firstly, the following base points Z1-Z6 for settings the human body zone are extracted as shown in FIG. 35.

The base point Z1 is the intersecting point between
a straight line passing through the feature point P7 of the top of head in parallel with the y-axis, and
a straight line passing through the feature point P8 of the forehead in parallel with the x-axis.

The base point Z2 is the midpoint of a straight line drawn between the feature point P7 of the top of head and the feature point P9 of the waist.

The base point Z3 is the point 20 pixels rightward of the feature point P9 of the waist.

The base point Z4 is the point 20 pixels rightward of the feature point P10 of the back of knee.

The base point Z5 is the point 20 pixels rightward and 20 pixels upward of the feature point P4 of the right foot heel.

The base point Z6 is the midpoint of a straight line drawn between the base point Z2 and the feature point P12 of the shoulder region.

As shown, the base points Z1-Z2 are set inside (person side) the feature points P1-P12, based on the experimental rule and the picture composition.

Next, using the base points Z1-Z6, the judgment section 7f defines a human body zone Za and stores it in the memory 8.

The human body zone Za is a region enclosed by a line connecting the base points Z1-Z2-Z3-Z4-Z5-Z4-Z6-Z1 in this order.

In this example, in order to increase the accuracy, the segment Z4-Z6 is defined as a bent line concave toward the back side made up of
an extension of a straight line drawn between the base points Z5 and Z4 which extension extends upward from the base point Z4, and
a straight line extends downward from the base point Z6 in parallel with a straight line drawn between the base points Z2 and Z3.

Also, the segment Z1-Z6 is defined as a bent line concave toward the back side made up of
a straight line extending from the base point Z6 in parallel with the y-axis, and
a part of a straight line drawn between the base points Z1 and Z2.

The pixels on the border of the human body zone Za are deemed to be included in the human body zone Za.

Based on the experimental rule, the pixels existing in the human body zone Za defined as above have a high probability of constituting the image of the person 11 in the address state.

[Human Body Range Determining Step]

Next, the human body range determining section of the judgment section 7f performs a human body range determining step S105.

This step S105 is to determine the human body range on the histogram, based on the histogram of the pixels in the human body zone and color data of the pixels in the human body zone of the address state frame.

The human body range is a range regarding the class of the histogram (in this example, brightness and hue) representing the human body.

The pixels in the human body zone Za of the address state frame have a high probability of representing the person according to the experimental rule. Accordingly, by utilizing the brightness and hue of the pixels, the human body range can be accurately defined on the histogram.

Figure 36:
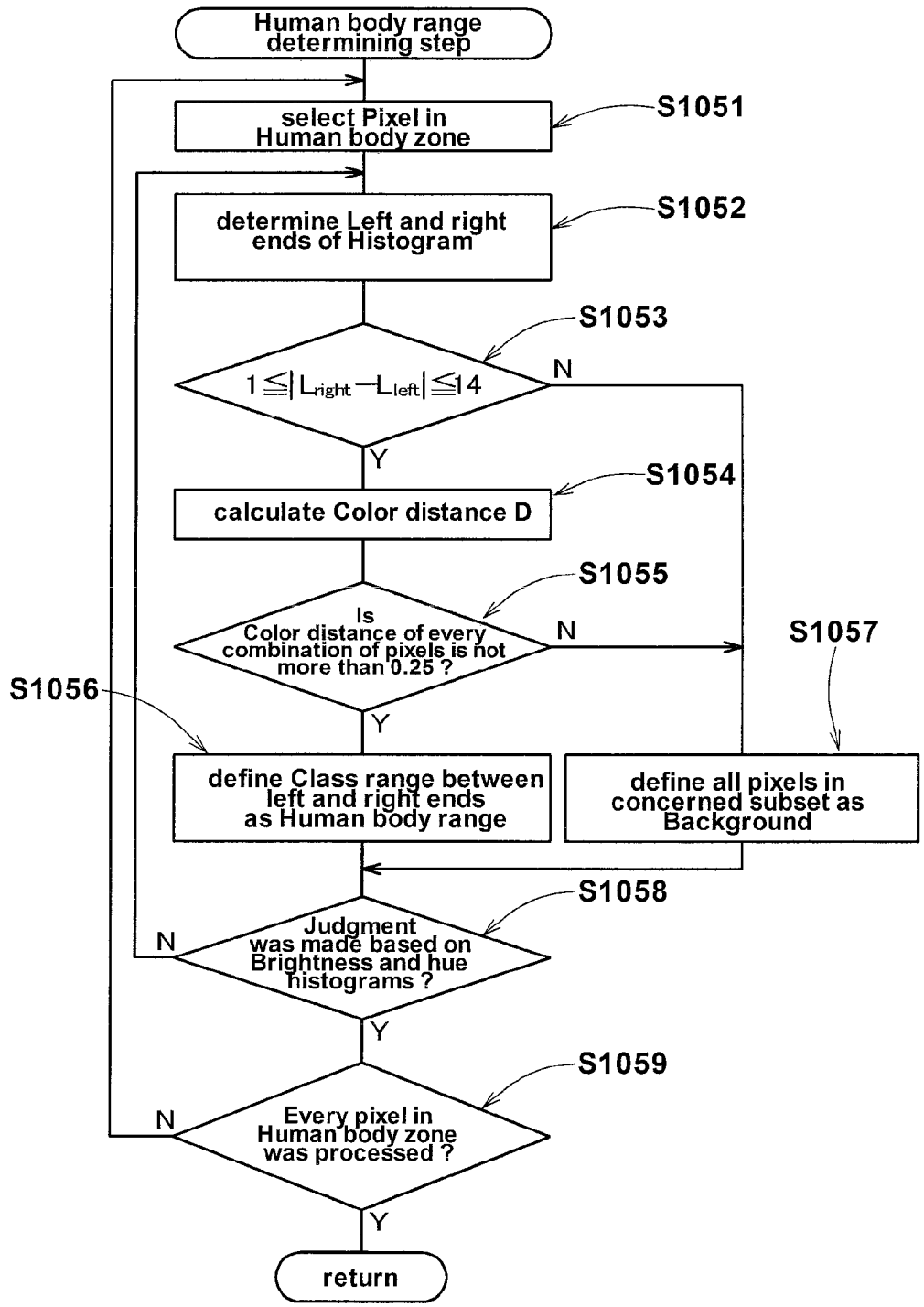

FIG. 36 shows a flowchart of an example of the human body range determining step.

In this example, firstly, the judgment section 7f looks for the memory 8 and selects a pixel in the human body zone Za of the address state frame which pixel is not yet processed.— Step S1051

With respect to the brightness (or hue) histogram of the pixels of the across-frame subset including the pixel concerned, the judgment section 7f determines the histogram's left and right ends (Lleft and (Lright)) (if hue, Hleft and Hright).—Step S1052

Figure 37:
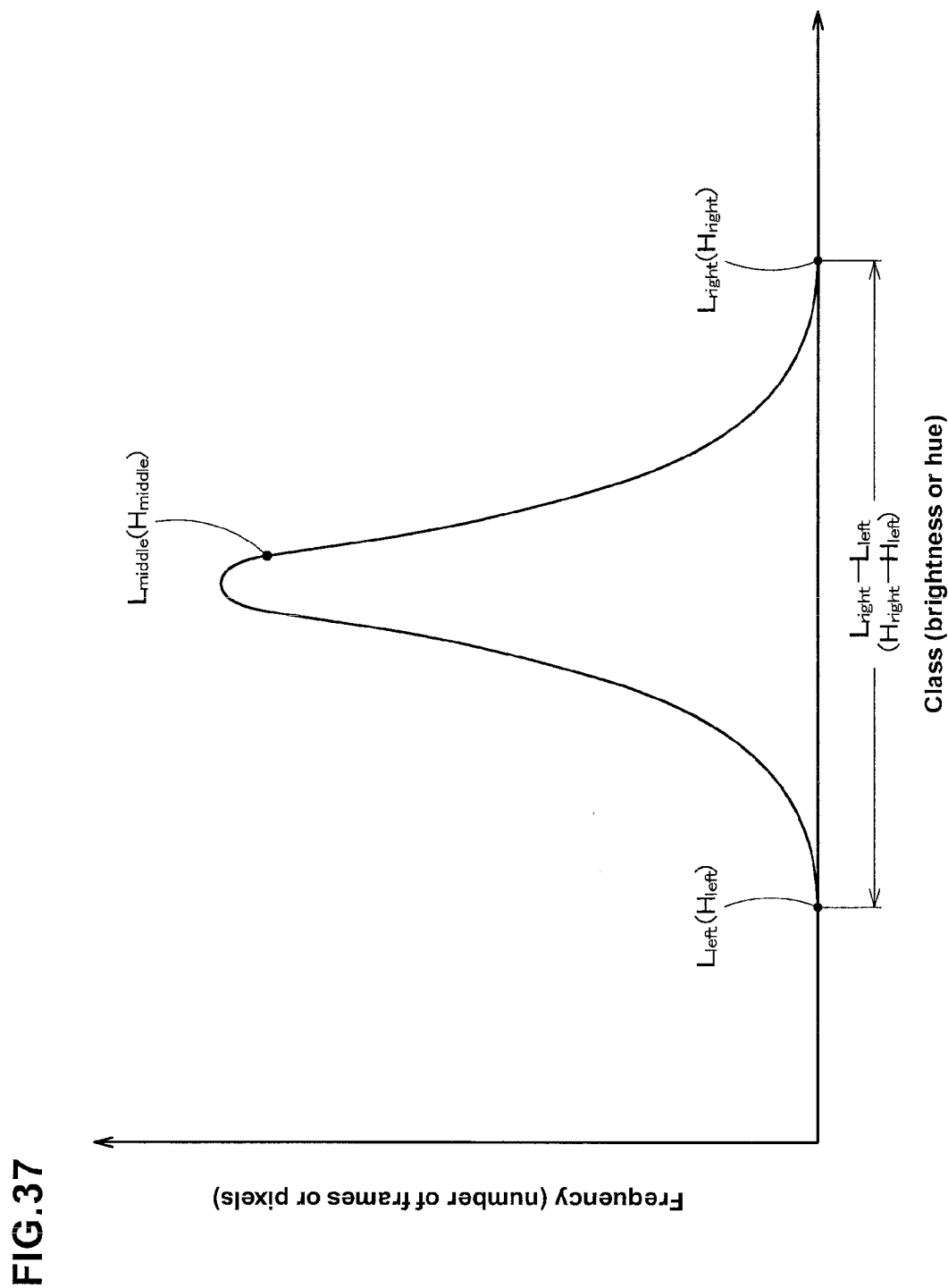

FIG. 37 shows an example of the histogram of the brightness (or hue) which is smoothened.

The maximum frequency Lmiddle of the brightness histogram and the maximum frequency Hmiddle of the hue histogram are located between the left and right ends of the respective histograms.

The left end (left) is determined as the position where the number of frame (frequency) becomes zero when checked toward the left side starting from the maximum frequency.

The right end (right) is determined as the position where the number of frame (frequency) becomes zero when checked toward the right side starting from the maximum frequency.

Here, in order to eliminate influence of noise, it is preferred that the position of zero continues for at least three successive classes. In other words, the position is so determined.

In this way, with respect to any pixel in the human body zone Za of the address state frame, the both ends of the range of the brightness (or hue) histogram of the across-frame subset including the concerned pixel are determined.

Next, the judgment section 7f determines if the absolute value |Lright−Lleft| of the difference between the left end (Lleft) and the right end (Lright) of the histogram (if hue, |Hright−Hleft|) is within a specified class range.—step S1053

In this embodiment, the judgment section 7f determines if the absolute value |Lright−Lleft| of the difference is not less than 1 and not more than 14 classes. This class range may be changed if needed.

If "No" in the aforementioned step S1053, namely, if the class range of the histogram is zero or more than a predetermined value, then the judgment section 7f defines the pixels of all of the frames at the concerned pixel position (namely, all of the pixels in the across-frame subset including the concerned pixel) as a pixel representing "the background".—Step S1057

If "Yes" in the aforementioned step S1053, the color distance D is calculated.—Step S1054

For example, when the color data of the pixels are HSV, and the color vector of the hue H1, chroma S1 and brightness V1 of a pixel is C1, and the color vector of the hue H2, chroma S2 and brightness V2 of another pixel is C2, then the color distance D(C1, C2) between these two pixels can be calculated by the following expression.

Thus, calculated in this step is the color distance between the HSV average of the pixels having the same class as the brightness (hue) of the concerned pixel and the HSV average of the pixels having same class from fright to Lleft.

$$D(C1, C2) = a\Delta H' + b\Delta S' + c\Delta V'$$

wherein a, b, c: constants (in this example, a=5.1, b=2.25, c=2.65)

$$\Delta H' = \Delta H/4.0$$

$$\Delta S' = \Delta S/2.0$$

$$\Delta V' = \Delta V/2.0$$

$$\Delta H = \{(X1-X2)^2 + (Y1-Y2)^2\}^{1/2}$$

$$\Delta S = |S1/100 - S2/100|$$

$$\Delta V = |V1/100 \oplus V2/100|$$

$$X1 = S'_{avg\,cos}(H1 \times 3.6)$$

$$Y1 = S'_{avg\,sin}(H1 \times 3.6)$$

$$X2 = S'_{avg\,cos}(H2 \times 3.6)$$

$$Y2 = S'_{avg\,sin}(H2 \times 3.6)$$

$$S'_{avg} = (S1' + S2')/2$$

$$S1' = \log_{10}(S1/100 \times 99 + 1.0)$$

$$S2' = \log_{10}(S2/100 \times 99 + 1.0)$$

Next, for every combination of the pixels in the across-frame subset in question, the judgment section 7f judges if the color distance is not more than 0.25.—Step S1055

This threshold value 0.25 of the color distance may be changed variously.

If "Yes" in the step S1055, then the class range between the left and right ends (left and fright) of the histogram is defined as the human body range.—Step S1056

If "No" in the step S1055, then all of the pixels in the concerned subset are defined as a pixel representing "the background".—Step S1057

Next, the judgment section 7f judges if the judgment has been made based on both of the brightness histogram and the hue histogram.—Step S1058

If the judgment has been done based on the brightness histogram but the hue histogram, then the step S1052 and subsequent steps are carried out with respect to the hue histogram. In this case, "brightness", "left end (Lleft)" and "right end (Lright)" in the descriptions of these steps Shall be replaced with "hue", "left end Hleft" and "right end Hright", respectively.

Next, the judgment section 7f judges if the human body range has been determined as explained for every pixel in the human body zone Za.—step S1059

If "No", then the next pixel is selected (step S1051), and the step S1052 and subsequent steps are carried out.

If "Yes" in the step S1059, then the flow returns to the main flow.

As explained above, using each pixel of the address state frame which pixel is considered as surely representing the human body, the human body range is determined to satisfy conditions such that the brightness (or hue) histogram of the across-frame subset including the concerned pixel has a certain class range, and in all combinations of the pixels therein, the color distances are not more than a specific value, which mean that the colors are approximate to each other. Accordingly, the human body range determining step can determine the human body range with accuracy.

[Human Body Range Propagating Step]

Next, based on the human body range defined in the step S105, the human body range propagating section of the judgment section 7f performs a human body range propagating step.

The human body range propagating step is to propagate the human body range to the histograms regarding pixels outside the human body zone Za.—step S106

In general, adjacent pixels each representing a human body often have substantially same colors. Therefore, in their histograms (as defined as above), the respective human body ranges have substantially same class ranges. Of course, the corresponding pixels have substantially same colors.

The human body range propagating step is based on these facts, and in this step, the human body range is defined on a non-judged pixel (across-frame subset) about which the human body range is not yet defined and which is included in eight nearby pixels (across-frame subsets) of a judged pixel (across-frame subset) about which the human body range has been defined with a high degree of accuracy.

Here, the "eight nearby pixels" are the left, upper left, upper, upper right, right, lower right, lower and lower left pixels adjacent to the pixel in question.

Figure 38:
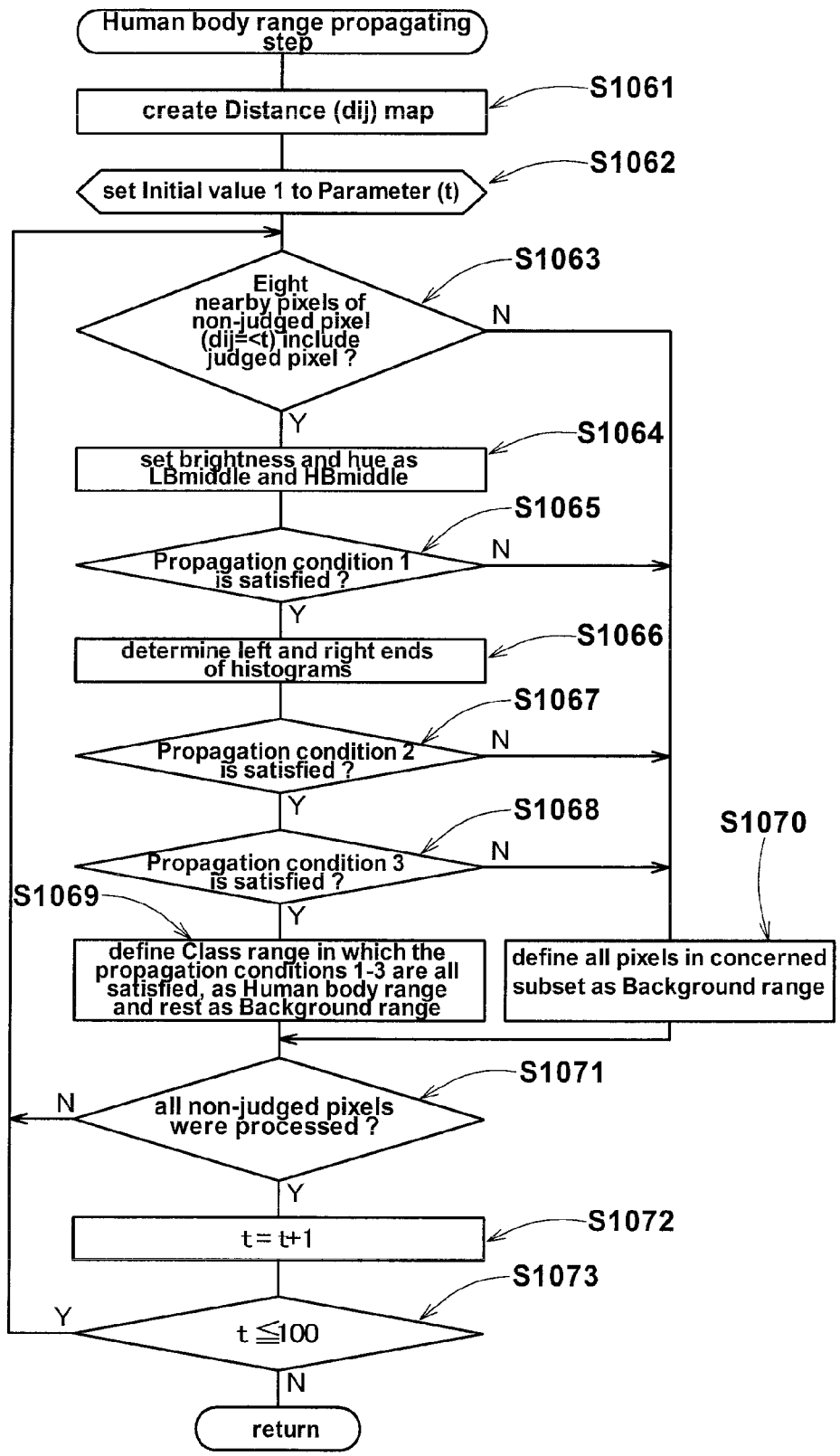

FIG. 38 shows a flowchart of an example of the human body range propagating step.

In this example, the judgment section 7f firstly creates a distance (dij) map.—step S1061

As shown in FIG. 39, the distance (dij) map shows distances from the human body zone Za (shaded area in the figure), wherein the value of the distance of the pixel nearest to the human body zone Za is "1", and the value increases one by one with increasing distance.

Next, the judgment section 7f sets the initial value of 1 to a parameter (t) defining or limiting a propagation range.—Step S1062

The judgment section 7f looks for the distance map and judges if the eight nearby pixels of a non-judged pixel (whose distance (dij)=<t) include a judged pixel.—step S1063

If "No" in the step S1063, namely, no judged pixel is included in the eight nearby pixels, it means that the non-judged pixel in question is not adjacent (continuous) to any of the pixels about which the human body range has already been defined. In this case, since the above-mentioned conditions are not satisfied, all of the pixels of the across-frame subset including the non-judged pixel in question are defined as "the background".—step S1070

If "Yes" in the step S1063, namely, the eight nearby pixels include one or more judged pixels, then the judgment section 7f sets the brightness and hue of the concerned non-judged pixel as LBmiddle and HBmiddle, respectively.—step S1064

Next, the judgment section 7f judges if a propagation condition 1 is satisfied.—step S1065

The propagation condition 1 is that the brightness and hue of a non-judged pixel to be judged approximate the mode of the brightness and the mode of the hue in the human body range regarding a judged pixel.

Specifically, the computation therefor is made as follows.
[Propagation Condition 1]
(When Brightness)

$$LA\text{max}-\beta =< LB\text{middle} =< LA\text{max}+\beta$$

$$D(CLB\text{middle}, CLA\text{max}) =< \rho$$

wherein
LAmax: the mode of the brightness in the human body range [Lleft, Lright] regarding the judged pixel,
  beta: a constant (in this example, 3),
  ρ: a constant (in this example, 0.25),
  D: color distance
  CLBmiddle: the color vector of the non-judged pixel in the address state frame,
  CLAmax: the color vector of the judged pixel of the mode value.
(When Hue)

$$HA\text{max}-\beta =< HB\text{middle} =< HA\text{max}+\beta$$

$$D(CHB\text{middle}, CHA\text{max}) =< \rho$$

wherein
HAmax: the mode of the hue in the human body range [Hleft, Hright] regarding the judged pixel,
  beta: a constant (in this example, 3),
  ρ: a constant (in this example, 0.25),
  D: color distance
  CHBmiddle: the color vector of the non-judged pixel in the address state frame,
  CHAmax: the color vector of the judged pixel of the mode value.

If "Yes" in the step S1065, namely, the non-judged pixel satisfies the propagation condition 1, then the judgment section 7f determines the left and right ends (LBleft, LBright, HBleft, HBright) of the histograms regarding the concerned non-judged pixel.—step S1066

Figure 40:
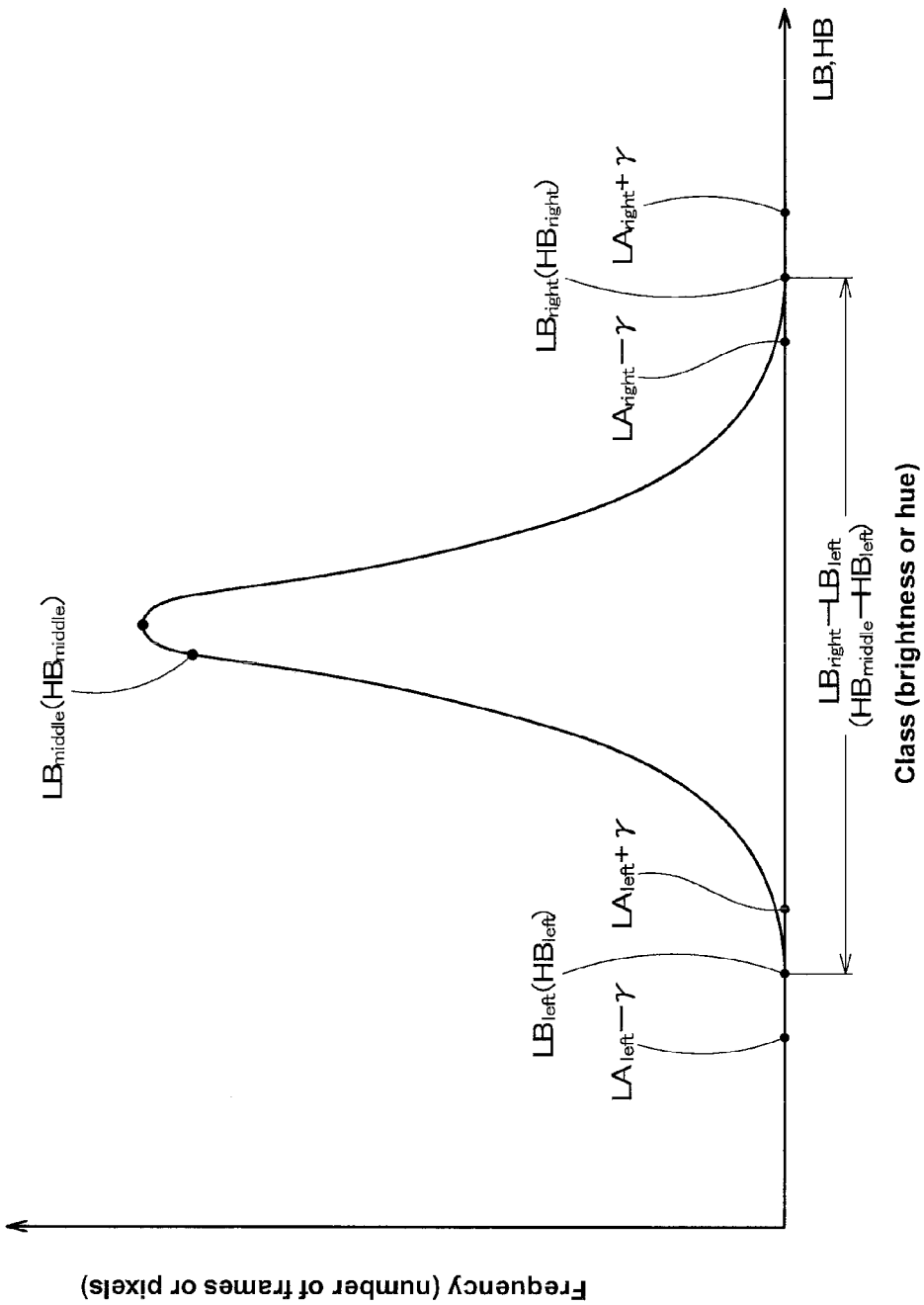

FIG. 40 shows an example of a smoothened histogram of the brightness (or hue) relating to the concerned non-judged pixel.

The maximum frequency LBmiddle of the brightness histogram and the maximum frequency HBmiddle of the hue histogram are located between the left and right ends of the respective histograms.

The left end (LBleft) is determined as the position where the number of frame (frequency) becomes zero when checked toward the left side starting from the maximum frequency.

The right end (LBright) is determined as the position where the number of frame (frequency) becomes zero when checked toward the right side starting from the maximum frequency.

Here, in order to eliminate influence of noise, it is preferred that the position of zero continues for at least three successive classes. In other words, the position is so determined.

In this way, the both ends of the range of the brightness (or hue) histogram are determined.

Next, the judgment section 7f judges if the non-judged pixel satisfies a propagation condition 2.—step S1067

The propagation condition 2 is such that the brightness histogram and the hue histogram regarding the non-judged pixel to be judged each exist within a predetermined narrow class range.

Specifically, the computation therefor is made as follows.
[Propagation Condition 2]
(When Brightness)

$$1 =< |LB\text{right}-LB\text{left}| =< 14$$

$$LA\text{left}-\gamma =< LB\text{left} =< LA\text{left}+\gamma$$

$$LA\text{right}-\gamma =< LB\text{right} =< LA\text{right}+\gamma$$

wherein
LAleft: the left end of the human body range regarding the judged pixel,
LAright: the right end of the human body range regarding the judged pixels,
  γ: a constant (in this example, 4),
(When Hue)

$$1 =< |HB\text{right}-HB\text{left}| =< 14$$

$$HA\text{left}-\gamma =< HB\text{left} =< HA\text{left}+\gamma$$

$$HA\text{right}-\gamma =< HB\text{right} =< HA\text{right}+\gamma$$

wherein
HAleft: the left end of the human body range regarding the judged pixels,
HAright: the right end of the human body range regarding the judged pixels,
  γ: a constant (in this example, 4).

If "Yes" in the step S1067, namely, the propagation condition 2 is satisfied, then
the judgment section 7f judges if the non-judged pixel satisfies a propagation condition 3.—step S1068
[Propagation Condition 3]

The propagation condition 3 regarding the brightness is that the color distance D between
the average color p of pixels in the same class of the brightness histogram (wherein, p∈[LBleft, LBright]) and the average color p of all pixels as LBmiddle
is not more than a constant value (in this example not more than 0.25).

The propagation condition 3 regarding the hue is that the color distance D between the HSV average m of pixels in the same class of the hue histogram (wherein, m∈[HBleft, HBright]) and the average color of all pixels as LBmiddle is not more than a constant value (in this example not more than 0.25).

By checking the propagation condition 3, it becomes possible to confirm that the brightness and hue histograms have trends toward the same color.

If the non-judged pixel satisfies the propagation condition 3, then with respect to each of the brightness and hue histograms regarding the said non-judged pixel, the judgment section 7f determines a class range in which the propagation conditions 1-3 are all satisfied, and defines this class range as the human body range and the rest as the background range.—step S1069

If the non-judged pixel does not satisfy at least one of the propagation conditions 1, 2 and 3 (If "No" in the step S1065, 1067 or 1068), then the judgment section 7f defines the pixels in the across-frame subset including the concerned non-judged pixel as "the background".—step S1070

Next, the judgment section 7f judges if all of the non-judged pixels have been processed.—step S1071

If "No" in this step S1071, then the next pixel is selected and the step S1063 and subsequent steps are carried out.

If "Yes" in this step S1071, then the judgment section 7f increments the above-mentioned parameter t limiting the propagation range by one to extend the propagation range.—Step S1072

Next, the judgment section 7f judges if the value of the parameter t is not more than the predetermined maximum value (in this example 100).—step S1073

If "Yes" in this step S1073, then the flow returns to the main flow.

If "No" in this step S1073, then the parameter t is incremented by one and the step S1063 and subsequent steps are carried out.

[Background Range Determining Step]

Next, based on histograms regarding pixels in the unmask region other than the mask region M and color data of the pixels in the unmask region of the address state frame, the background range determining section of the judgment section 7f determines a background range.—step S107

The background range is a class range of the histogram (brightness, hue) representing the background.

The pixels in the unmask region of the address state frame have a high probability of representing the background. Accordingly, by utilizing the brightness and hue of the pixels in the unmask region, the background range can be accurately defined on the histogram.

The flow and flowchart of the background range determining step are omitted because it is essentially same as that of the human body range determining step Shown in FIG. 36, wherein "human body range" and "background range" shall be replaced with "background range" and "human body range", respectively.

Briefly, the flow of the background range determining step performed by the judgment section 7f is as follows.

a) The judgment section 7f selects one pixel in the unmask region of the address state frame which pixel is not yet processed.—(corresponding to step S1051)

b) with respect to the brightness (or hue) histogram of the pixels of the across-frame subset including the pixel concerned, the judgment section 7f determines the histogram's left and right ends (left and (right)) (if hue, Hleft and Hright).—(corresponding to step S1052)

c) The judgment section 7f determines if the absolute value |Lright−Lleft| of the difference between the left end (left) and the right end (right) of the histogram (if hue, |Hright−Hleft|) is within a specified class range.—(corresponding to step S1053)

d) If "No" in the aforementioned step c), then the judgment section 7f defines the pixels of all of the frames at the concerned pixel position (namely, all of the pixels in the across-frame subset including the concerned pixel position) as a pixel representing "the person".—(corresponding to Step S1057)

e) If "Yes" in the aforementioned step c), then the color distance D is calculated.—(corresponding to Step S1054)

f) For every combination of the pixels in the across-frame subset in question, the judgment section 7f judges if the color distance is within a specified range.—(corresponding to step S1055)

g) If "Yes" in the step f), then the class range between the left and right ends (left and Lright) of the histogram is determined as the background range and all of the pixels in the concerned subset are defined as a pixel representing "the background".—(corresponding to step S1056)

h) If "No" in the step f), then all of the pixels in the concerned subset are defined as a pixel representing "the person".—(corresponding to step S1057)

i) For every pixel in the unmask region, the judgment section 7f performs the steps a)-h).

As explained above, using each pixel of the address state frame which pixel is considered as surely representing the background, the background range is determined to satisfy conditions such that the brightness (or hue) histogram of the across-frame subset including the concerned pixel has a certain class range, and in all combinations of the pixels therein, the color distances are not more than a specific value, which mean that the colors are approximate to each other.

Accordingly, the background range determining step can determine the background range with accuracy.

[Background Range Propagating Step]

Next, the background range propagating section of the judgment section 7f performs a background range propagating step S108.

In this step S108, based on the determined background range, the background range is propagated to the histogram regarding the pixels in the mask region.

The flow and flowchart of the background range propagating step are omitted because it is essentially same as that of the human body range propagating step Shown in FIG. 38, wherein "human body range" and "background range" shall be replaced with "background range" and "human body range", respectively.

Briefly, the flow of the background range propagating step performed by the judgment section 7f is as follows.

A) The judgment section 7f creates a distance (dij) map.—(corresponding to step S10610

B) The judgment section 7f sets the initial value of 1 to a parameter (t) defining or limiting a propagation range.—(corresponding to step S1062)

C) The judgment section 7f looks for the distance map and judges if a judged pixel on which the background range is defined is included in eight nearby pixels of a non-judged pixel whose distance (dij)=<t.—(corresponding to step S1063)

D) If "No" in the step C), then all of the pixels of the across-frame subset including the non-judged pixel in question are defined as "the person".—(corresponding to step S1070)

E) If "Yes" in the step C), namely, the eight nearby pixels include one or more judged pixels, then the judgment section 7*f* sets the brightness and hue of the concerned non-judged pixel as LBmiddle and HBmiddle, respectively.—(corresponding to step S1064)

F) The judgment section 7*f* judges if the propagation condition 1 is satisfied by the concerned non-judged pixel.—(corresponding to step S1065)

If the propagation condition 1 is satisfied, then the judgment section 7*f* determines the left and right ends (LBleft, LBright, HBleft, HBright) of the histograms regarding the concerned non-judged pixel.—(corresponding to step S1066)

Then, the judgment section 7*f* judges if the non-judged pixel satisfies the propagation condition 2.—(corresponding to step S1067)

G) If the propagation condition 2 is satisfied, then the judgment section 7*f* judges if the non-judged pixel satisfies the propagation condition 3.—(corresponding to step S1068)

H) If the non-judged pixel satisfies the propagation condition 3, then
with respect to each of the brightness and hue histograms regarding the said non-judged pixel,
the judgment section 7*f*
determines a class range in which the propagation conditions 1-3 are all satisfied, and
defines this class range as the background range and the rest as the human body range.—(corresponding to step S1069)

I) If the non-judged pixel does not satisfy at least one of the propagation conditions 1, 2 and 3,
then the judgment section 7*f* defines the pixels in the across-frame subset including the concerned non-judged pixel as "the person".—(corresponding to step S1070)

J) If all of the non-judged pixels have been processed, then the judgment section 7*f* increments the parameter t limiting the propagation range by one to extend the propagation range.—(corresponding to step S1072)

K) The steps C)-J) are repeated until the parameter t reaches to the predetermined maximum value.

[Consistency Check Step]

Next, the consistency check section of the judgment section 7*f* checks the consistency of the background range and the human body range.—step S109

Figure 41:
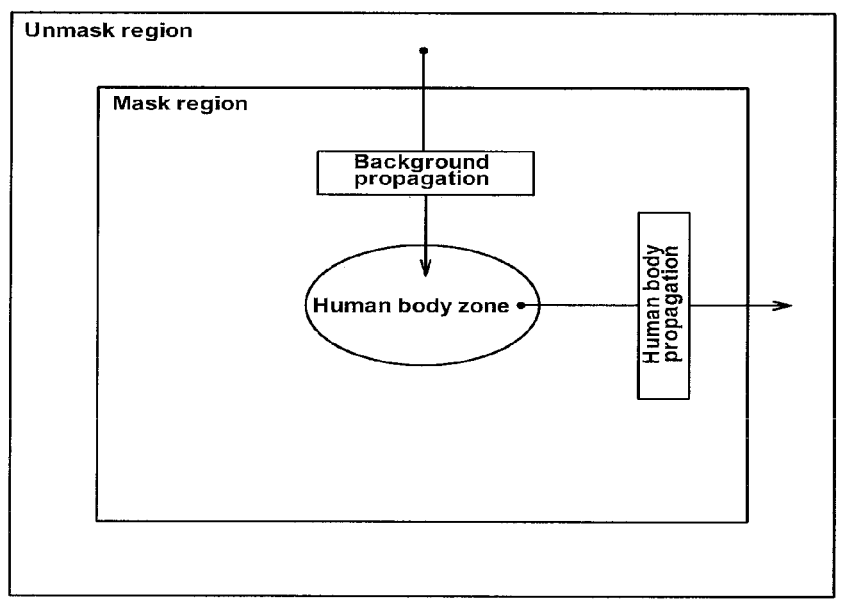

FIG. 41 is a diagrams for explaining the previous processing. As shown, the human body range propagating step is to propagate the human body range peripherally by utilizing the pixels in the human body zone. Contrarily, the background range propagating step is to propagate the background range inwardly by utilizing the pixels in the unmask region.

Through these two steps, the determinations of the human body range and the background range are made by the two different methods, for each of the following domains:

Inside the human body zone (the human body range determining step and the background range propagating step);

Outside the human body zone and inside the mask region (the human body range propagating step and the background range propagating step); and Inside the unmask region (the background range determining step and the human body range propagating step).

Therefore, there is a possibility that inconsistency exists between the ranges determined by these different methods. In this embodiment, therefore, in order to solve such inconsistency, a consistency check step is carried out.

Figure 42:
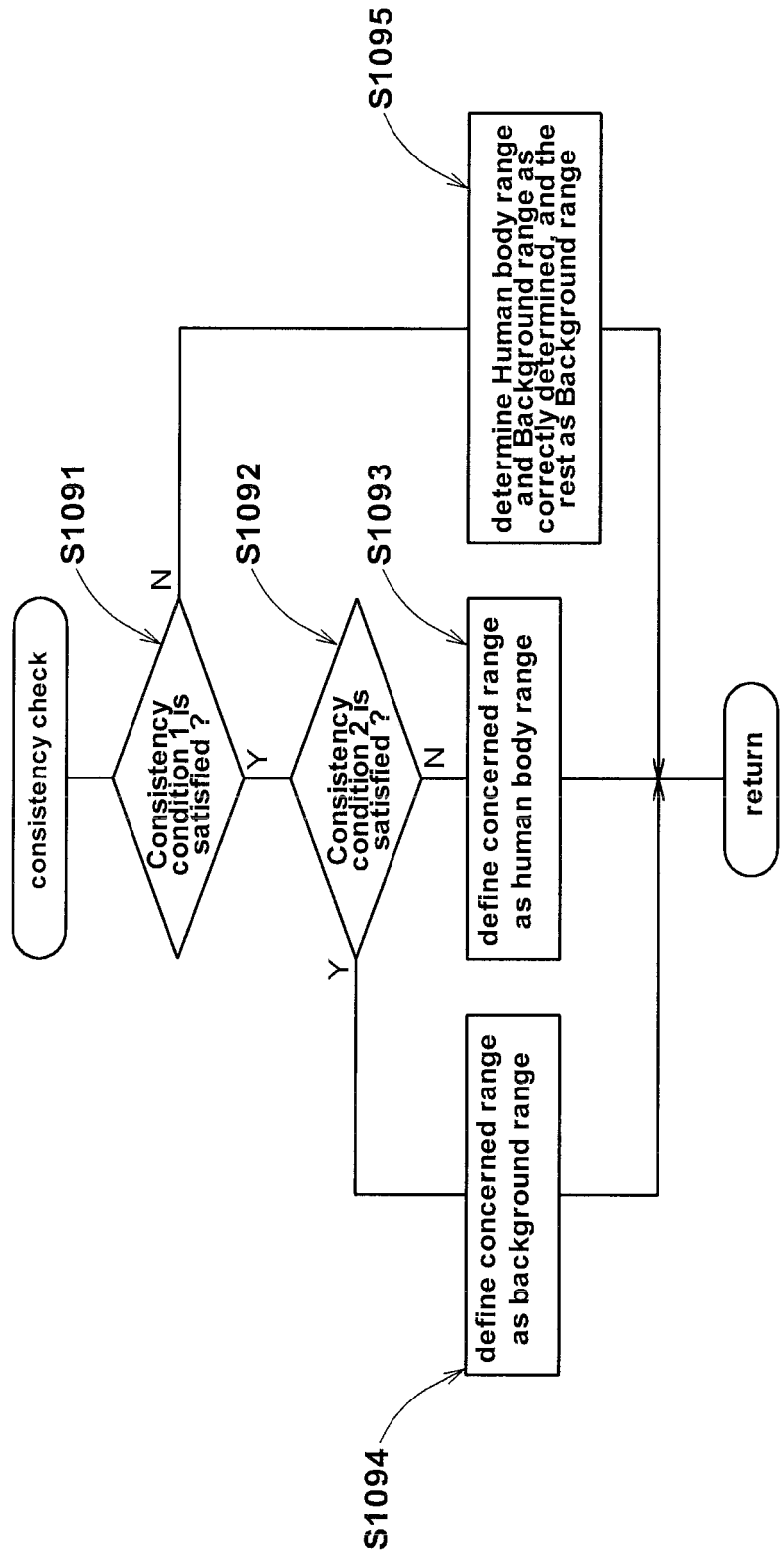

FIG. 42 shows an example of the flowchart of the consistency check step.

Firstly, the judgment section 7*f* judges if a consistency condition 1 is satisfied.—step 1091

In this example, the consistency condition 1 is as follows.
[Consistency Condition 1]

$$D(Cb;Ch)<0.3$$

With respect to the across-frame subset on which a background range and a human body range are determined through the human body range propagating step, the background range propagating step, the human body range determining step or the background range determining step,
the color distance D(cb;ch) between the average cb of (brightness and hue) values of the pixels in the background range and the average ch of (brightness and hue) values of the pixels in the human body range is less than the predetermined fixed value (in this example 0.3).

If "No" in this step S1091, then the judgment section 7*f* judges the determined human body range and the background range as correctly determined. And, the rest is determined as the background range.—step S1095

In the consistency condition 1, whether or not the average of the background range is excessively close to the average of the human body range is checked.

Therefore, if the consistency condition 1 is not satisfied, then the judgment section 7*f* judges such that the human body range and the background range are sufficiently different in the color from each other and treats the results of the former determination as correct.

If "Yes" in the step S1091, namely, the consistency condition 1 is satisfied, then the judgment section 7*f* judges if a consistency condition 2 is satisfied.—step S1092

The consistency condition 2 in this embodiment is as follows:
[Consistency Condition 2]

$$D(Cb;Cback)<D(Cb;Chuman) \quad (1)$$

$$A>B \quad (2)$$

wherein

D(Cb;Cback): the color distance between the average Cb of values of the pixels in the concerned range and the color vector Cback of the pixels in the background range regarding a pixel in the unmask region as the source in the propagation, D(Cb;Chuman): the color distance between the average Cb of values of the pixels in the concerned range and the color vector Chuman of the pixels in the human body range regarding a pixel in the human body zone as the source in the propagation, Fb: the frames or pixels in the background range of an across-frame subset regarding a pixel satisfying D(cb;ch)<0.3

Fback: the frames or pixels in the background range corresponding to Cback,

Fhuman: the frames or pixels in the human body range corresponding to Chuman,

A: the number of pixels included in both of Fb and Fback/the number of Fback,

B: the number of pixels included in both of Fb and Fhuman/the number of Fhuman.

Figure 43:
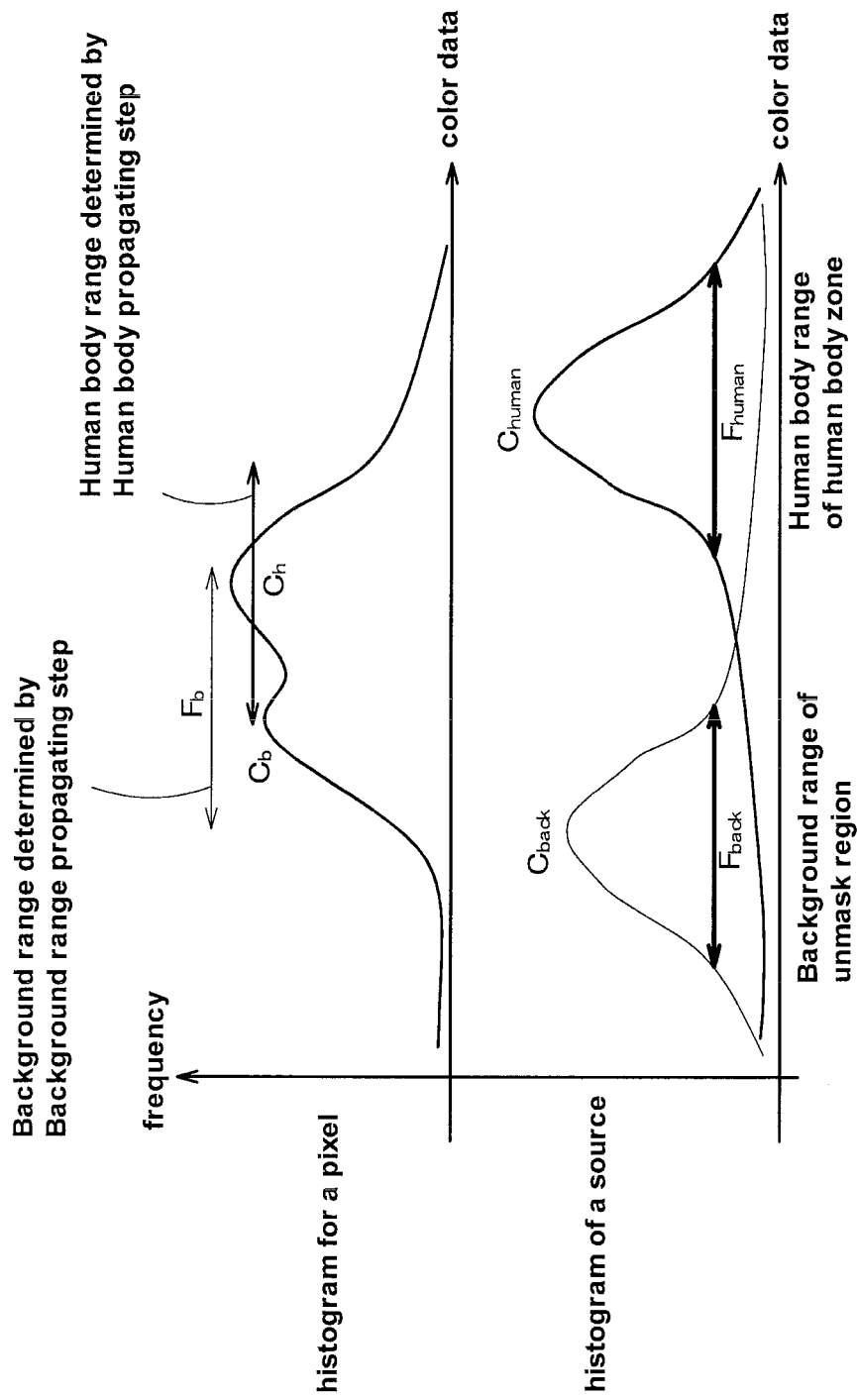

FIG. 43 shows histograms for explaining the propagations of a background range and a human body range.

If the color distance of the average color of the pixels in the background range regarding a pixel is calculated from the background color of the source in the propagation and from the human body color of the source in the propagation, then there is a possibility that the color distance from the background color becomes smaller than the color distance from the human body color.

This is checked by the inequation (1) in the consistency condition 2.

If an across-frame subset includes the frames or pixels as the background more than the frames or pixels as the person the background range of this subset is more reliable than other. This is checked by the inequation (2) in the consistency condition 2.

If "Yes" in the step S1092, namely, the consistency condition 2 is also satisfied, then the judgment section 7f defines the concerned range as the background range.—step S1094

If the consistency condition 2 is not satisfied, then the judgment section 7f defines the concerned range as the human body range.—step S1093

Through the foregoing processes, all of the pixels of all of the frames are each classified to "the background range" or "the person range".

In each of the across-frame subsets, each pixel can be defined as the background or the person according to the brightness histogram and hue histogram.

Figure 44B:
FIGS. 44A and 44B show an address state frame and the silhouette extracted therefrom by the silhouette extraction method in this embodiment.
Figure 44A:
Figure 45B:
FIGS. 45A and 45B show a top-of-backswing frame and the silhouette extracted therefrom by the silhouette extraction method in this embodiment.
Figure 45A:

FIGS. 44-46 show the silhouettes of the person extracted from the address state frame, top-of-backswing frame and finish-state frame by the silhouette extraction method in this embodiment.

In this method, the silhouettes of the person are almost correctly extracted.

Using such silhouettes, effective diagnoses on golf swing can be made.

In the present invention, various modifications are possible.

Figure 47:

For example, when the recording of swing by the camera 4 is made in a golf practice range, there is a possibility that one or more pillars 16 supporting the net of the golf practice range is included in the background of each frame as shown in FIG. 47.

Such a pillar 16 extends vertically in each frame, therefore, the pillar 16 breaks the horizontal continuity of each color appearing in the background. This tends to become a cause for decreasing the accuracy of the background range propagating step. Accordingly, by detecting the pillar 16 in the background in advance, the propagating operation in the background range propagating step can bypass the pixels representing the pillar 16, and thereby it is possible to increase the accuracy of the background range propagating step.

A pillar has the following characteristics or regularity:
- A) it locates in the upper area of each frame (for example $0=<y=<250$)
- B) it has substantially achromatic colors
- C) it extends almost vertically (the inclination angle is at most 2 degrees)
- D) its width in the x-axis direction is within a specific pixels range (in this example, 1 to 11 pixels).

In this embodiment, based on the above-mentioned regularity, and data about each of the pixels in the address state frame, the pixels are searched for the pillar. And a pillar range which is a class range corresponding to the pillar 16 in the address state frame is determined.

Then, in the above-mentioned background range determining step, the pixels of the pillars range are bypassed.

Figure 48:
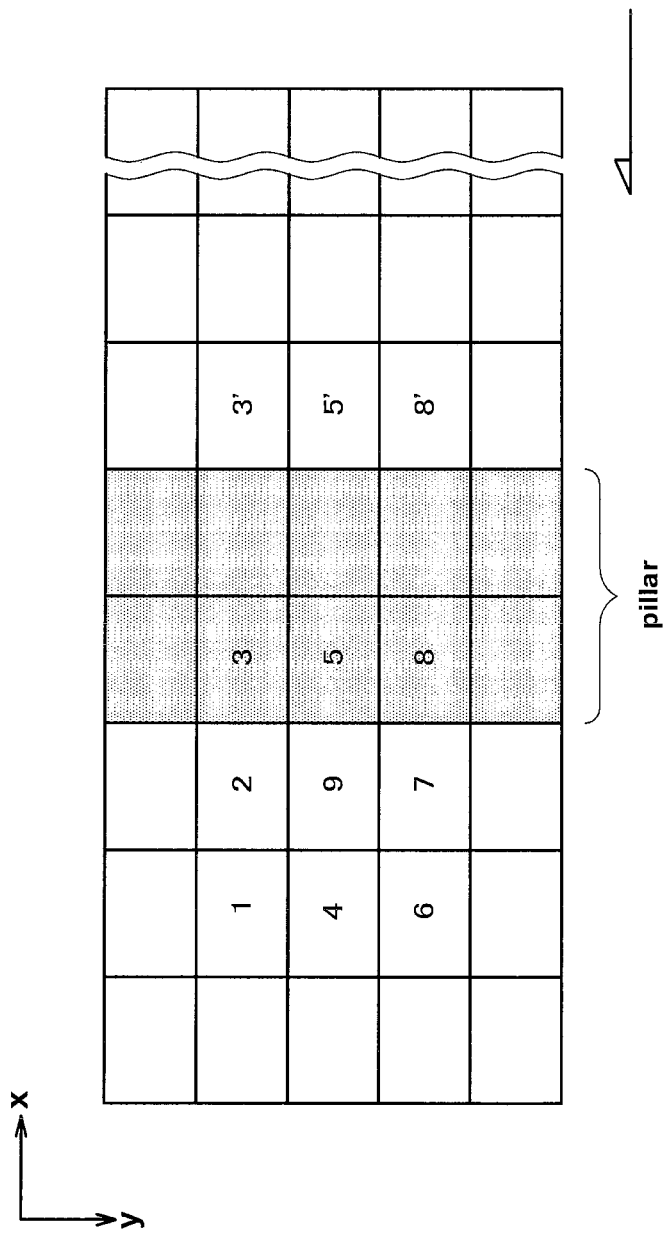

FIG. 48 shows a pixel array wherein the shaded pixels indicate a part of a pillar 16.

When a pixel 9 is processed in the background range propagating step, the eight nearby pixels of the pixel 9 are pixels 1-8 by ordinary. However, in this example, the pixels 3, 5 and 8 are of the pillar. Accordingly, these pixels are bypassed or skipped, and the pixels 1, 2, 4, 6, 7, 3', 5' and 8' are treated as the eight nearby pixels.

Therefore, even when the pixels 1, 2, 4, 6 and 7 are non-judged pixels for example, if one of the pixels 3', 5' and 8' is a judged pixel, then using such judged pixel, the background range for the pixel 9 can be determined.

The silhouette extraction system of the present invention may be embodied by only the CPU of the smartphone 2 to execute the method of the present invention only by the smartphone without connecting the server.

\* Comparison Tests Relating to Silhouette Extraction Method

Figure 49:
Figure 49:
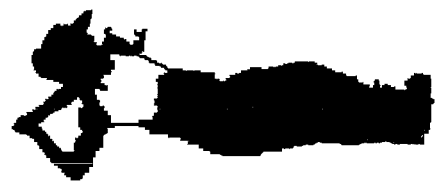
Figure 49:
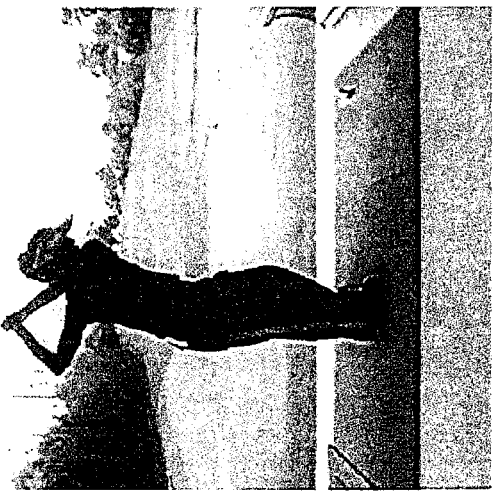

FIG. 49 shows an original image and silhouettes as an example 1 and Ref. 1.

Example 1 is extracted from the original image by the method according to the present invention.

Ref. 1 is extracted from the original image by a method disclosed in the above-mentioned patent document 1.

Figure 50:
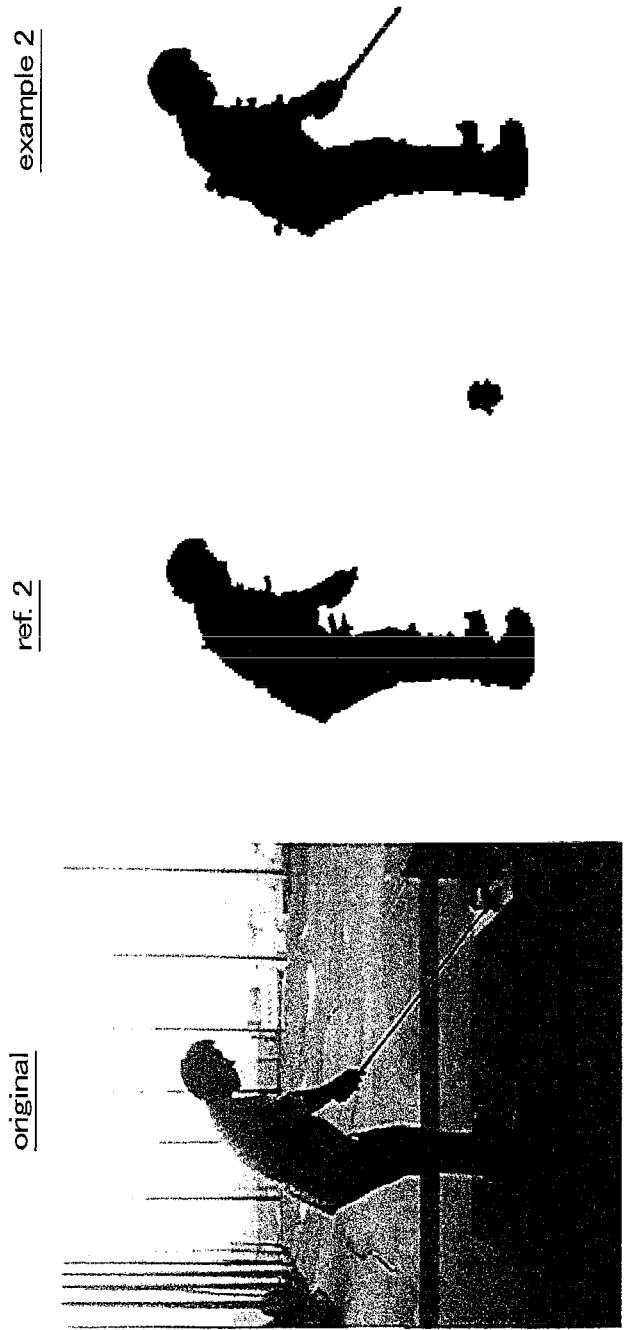

FIG. 50 shows an original image and silhouettes as an example 2 and Ref. 2.

Example 2 is extracted from the original image by the method according to the present invention.

Ref. 2 is extracted from the original image by a method disclosed in the above-mentioned patent document 1.

Figure 51:
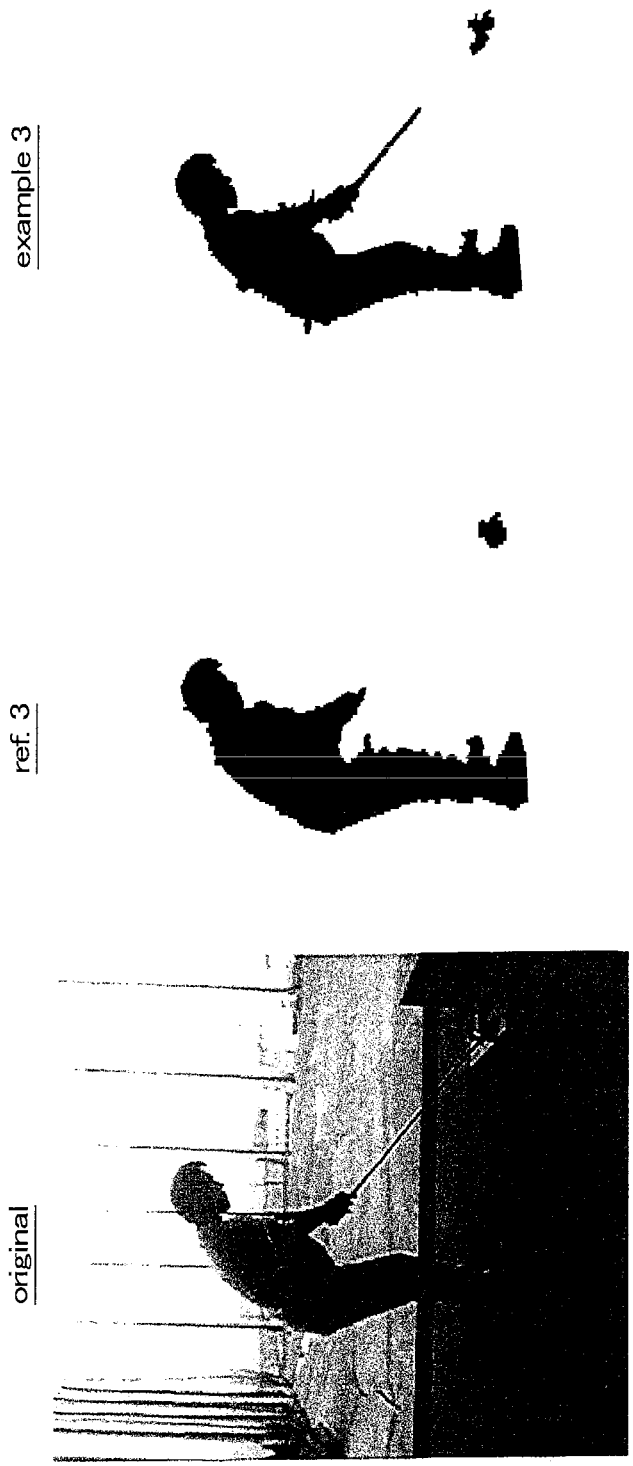

FIG. 51 shows an original image and silhouettes as an example 3 and Ref. 3.

Example 3 is extracted from the original image by the method according to the present invention wherein, in the background range propagating step, the propagation bypassed the pixels representing the pillars.

Ref. 3 is extracted from the original image by a method disclosed in the above-mentioned patent document 1. In Ref. 3, a part of a pillar is incorrectly labeled as the person.

Figure 52:
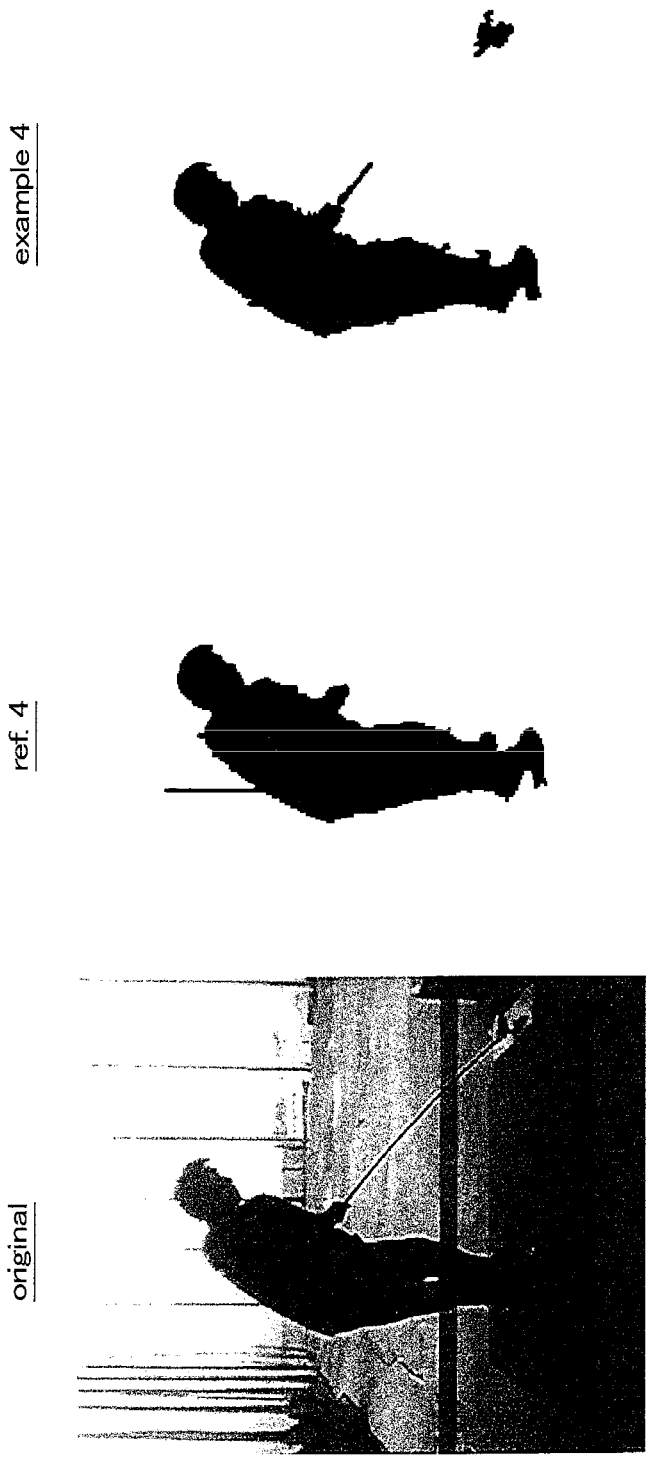

FIG. 52 shows an original image and silhouettes as an example 4 and Ref. 4.

Example 4 is extracted from the original image by the method according to the present invention wherein, in the background range propagating step, the propagation bypassed the pixels representing the pillars.

Ref. 4 is extracted from the original image by a method disclosed in the above-mentioned patent document 1. In Ref. 4, a part of a pillar is incorrectly labeled as the person.

As descried above, in the method and system for extracting a silhouette of a person swing a golf club from one of a plurality of frames captured from a moving image according to the present invention, with respect to each pixel in one of the frames, an across-frame subset which is a subset of the pixels of all of the frames at the position of the concerned pixel is created. With respect to each across-frame subset, a histogram of color data is created. From the captured frames, an address state frame is extracted. Feature-points of a person with a golf club are located in the address state frame. Based on the located positions of the feature points, a mask region including the person, golf club and a part of the background is defined, and a human body zone is defined within the mask region. Based on color data of the pixels in the human body zone and the histogram regarding each of the pixels, a human body range which is a class range of the histogram representing the person is determined. The human body ranges are propagated to the histograms regarding the pixels outside the human body zone. Based on the histograms and color data of the pixels in an unmask region, a background range which is a class range of the histogram representing the background is determined. The background ranges are propagated to the histograms regarding the pixels in the mask region.

Therefore, even if the person and the background have approximate colors, the person can be differentiated from the background and the silhouette can be accurately extracted.

The invention claimed is:

1. A silhouette correction method for correcting a silhouette of a person which is extracted from a frame including the person and the background by labeling each pixel of the frame as the person or the background, wherein pixels in a target region which is at least part of the frame are relabeled,
the method comprising
a step in which, by the use of pixels in the target region labeled as the person, a person histogram of which frequency and class are the number of pixels and color data of the pixels, respectively, is created,
a step in which, by the use of pixels in the target region labeled as the background, a background histogram of which frequency and class are the number of pixels and color data of the pixels, respectively, is created,
a step in which, for each pixel in the target region, by the use of the person histogram, the background histogram and color data of each pixel in the target region, a first connective cost of the pixel which represents the degree of similarity to the color data of the person and the degree of similarity to the color data of the background is calculated,
a step in which, for each pixel in the target region, a second connective cost of the pixel which represents continuity of the color data of the pixel from adjacent pixels is calculated by the use of difference values from the adjacent pixels,
a correcting step in which a graph of which vertices are the pixels in the target region, and of which edges between the vertices are the first and second connective costs is prepared, and a min-cut by which the graph is divided into two so that the sum of the first and second connective costs becomes minimum, is computed, and
based on the min-cut, the pixels in the target region are relabeled to correct the silhouette.

2. The silhouette correction method according to claim 1, wherein
the first connective cost is calculated by the following expressions $$Ph_{(I)(x,y)} = nh_{(I)}(C_{(I)(x,y)}) \times \lambda / th$$

and $$Pb_{(I)(x,y)} = nb_{(I)}(C_{(I)(x,y)}) \times \lambda / tb$$

wherein
$Ph_{(I)(x,y)}$: the first connective cost to the color data of the person, of a target pixel having X-Y coordinate (x, y) and color data (I),
$nh_{(I)}(C_{(x,y)})$: the frequency in the person histogram, of pixels having the color data (I) of the target pixel $C_{(I)(x,y)}$,
th: total number of the pixels in the target region which are labeled as the person,
$Pb_{(I)(x,y)}$: the first connective cost to the color data of the background, of the target pixel having X-Y coordinate (x, y) and color data (I),
$nb_{(I)}(C_{(I)(x,y)})$: the frequency in the background histogram, of pixels having the color data (I) of the target pixel $C_{(I)(x,y)}$,
tb: the total number of the pixels in the target region which are labeled as the background, and
$\lambda$: a constant.

3. The silhouette correction method according to claim 2, wherein
with respect to each pixel relabeled as the person from the background, the frequency $nb_{(I)}(C_{(I)(x,y)})$ is multiplied by a constant more than 1 to increase the degree of similarity to the color data of the background, and
the first and second connective costs are again calculated, and then
the correcting step is again carried out.

4. The silhouette correction method according to claim 1 or 2, wherein the second connective cost is calculated by the following expression $$Pd = k \times \epsilon / Dp$$

wherein
Pd: the second connective cost of a target pixel,
k: a constant,
$\epsilon$: a constant which is more than 0 and less than 1 when the target pixel is located at the border of the silhouette of the person, otherwise 1, and
Dp: a difference value between the target pixel and an adjacent pixel.

5. The silhouette correction method according to claim 1, which further comprises
a step in which an image of logical product of the silhouette before corrected and the silhouette after corrected is prepared and displaced.

6. A silhouette correction system for implementing the silhouette correction method according to the present invention as set forth in claim 1, which comprises
a memory in which data on the pixels of the frame are stored, and
an arithmetic section,
the arithmetic section including a person histogram creating section, a background histogram creating section, a first connective cost calculating section, a second connective cost calculating section, and a correcting section,
wherein
the person histogram creating section creates, by the use of pixels in the target region labeled as the person, a person histogram of which frequency and class are the number of pixels and color data of the pixels, respectively,
the background histogram creating section creates, by the use of pixels in the target region labeled as the background, a background histogram of which frequency and class are the number of pixels and color data of the pixels, respectively,
the first connective cost calculating section calculates, for each pixel in the target region, a first connective cost of the pixel representing the degree of similarity to the color data of the person and representing the degree of similarity to the color data of the background, by the use of the person histogram, the background histogram and color data of each pixel in the target region,
the second connective cost calculating section calculates, for each pixel in the target region, a second connective cost of the pixel representing continuity of the color data of the pixel from adjacent pixels, by the use of difference values from the adjacent pixels,
the correcting section prepares a graph in which the pixels are vertices and the first and second connective costs are edges between the vertices, and computes a min-cut by which the graph is divided into two so that the sum of the first and second connective costs becomes minimum, and relabels the pixels in the target region based on the min-cut to correct the silhouette.

7. A silhouette extraction method for extracting a silhouette of a person swing a golf club, from one of a plurality of frames captured from a moving image of the person swing the golf club, by utilizing color data obtained from the plurality of frames, the method comprising:
a step in which, with respect to each pixel in one of the frames, an across-frame subset which is a subset of the pixels of all of the frames at the position of the concerned pixel is created,
a step in which, with respect to each of the across-frame subsets, a histogram of which frequency and class are the number of frames and color data of the pixels, respectively, is created,
a step in which, from the captured frames, an address state frame which is a frame including the person addressing a ball, is extracted,
a step in which, for the address state frame, predetermined feature points of a person with a golf club are located,
a step in which, based on the located positions of the feature points, a mask region which is a region including the person, the golf club and a part of the background around the person and the golf club is defined,
a step in which, based on the located positions of the feature points, a human body zone in which pixels included therein have a high probability of representing the person, is defined within the mask region,
a step in which, based on color data of the pixels in the human body zone of the address state frame and the histogram regarding each pixels in the human body zone, a human body range which is a class range of the histogram representing the person, is determined for each of the histograms,
a step in which the determined human body ranges are propagated to the histograms regarding the pixels outside the human body zone,
a step in which, based on the histogram regarding each pixel in an unmask region other than the mask region and color data of the pixels in the unmask region of the address state frame, a background range which is a class range of the histogram representing the background is determined for each of the histograms,
a step in which the determined background ranges are propagated to the histograms regarding the pixels in the mask region.

8. The silhouette extraction method according to claim 7, wherein
the histogram of the across-frame subset includes
a first histogram in which the color data are brightness of all of the pixels in the across-frame subset,
a second histogram in which the color data are hue of the pixels in the across-frame subset having chromatic colors,
a third histogram in which the color data are brightness of the pixels in the across-frame subset having achromatic colors.

9. The silhouette extraction method according to claim 7 or 8, wherein
the feature points are the top of head, forehead, back, waist, back of knee, heel, toe, thigh, hand, and shoulder of a human body in an address state, and a club head of the golf club.

10. The silhouette extraction method according to claim 7, wherein
the step in which the mask region is defined, comprises
a step of defining an initial stage mask region by connecting the feature points, and
a step of expanding the initial stage mask region by a predetermined extent or pixels.

11. The silhouette extraction method according to claim 10, wherein
said step in which the human body zone is defined, comprises
a step in which, based on the feature points, base points which are considered as points on the human body are defined at positions within the initial stage mask region, and
a step in which, by the use of the base points, the human body zone is determined.

12. The silhouette extraction method according to claim 7, wherein
the method further comprises a step of detecting pixels in the above-mentioned one of the frames which pixels represent a pillar of a golf practice range, and
in said step in which the determined background ranges are propagated to the histograms regarding the pixels in the mask region, the propagation bypasses the detected pixels representing the pillar.

13. The silhouette extraction method according to claim 7, wherein
the method further comprises a step of checking the consistency of the determined background range and the determined human body range.

14. A silhouette extraction system for implementing the silhouette extraction method as set forth in claim 7, comprising
a camera for taking a moving image,
a memory for storing the moving image, and
an arithmetic section,
the arithmetic section including a across-frame-subset creating section, a histogram creating section, and a judgment section,
wherein
the across-frame-subset creating section creates, with respect to each pixel in one of the frames, an across-frame subset which is a subset of the pixels of all of the frames at the position of the concerned pixel,
the histogram creating section creates, with respect to each of the across-frame subsets, a histogram of which frequency and class are the number of frames and color data of the pixels, respectively,
the judgment section comprises an address state frame extracting section, a feature point locating section, a mask region defining section, a human body zone setting section, a human body range determining section, a human body range propagating section, a background range determining section, and a background range propagating section,
wherein
the address state frame extracting section extracts from the captured frames, an address state frame which is a frame including the person addressing a ball,
the feature point locating section locates, for the address state frame, predetermined feature points of a person with a golf club,
the mask region defining section defines, based on the located positions of the feature points, a mask region which is a region including the person, the golf club and a part of the background around the person and the golf club,
the human body zone setting section defines a human body zone within the mask region, based on the located positions of the feature points, the human body zone is such that pixels included therein have a high probability of representing the person, the human body range determining section determines, based on color data of the pixels in the human body zone of the address state frame and the histogram regarding each pixels in the human body zone, a human body range for each of the histograms, the human body range is a class range of the histogram representing the person, the human body range propagating section propagates the determined human body ranges to the histograms regarding the pixels outside the human body zone, the background range determining section determines, based on the histogram regarding each pixel in an unmask region other than the mask region and color data of the pixels in the unmask region of the address state frame, a background range for each of the histograms, the background range is a class range of the histogram representing the background, the background range propagating section propagates the determined background ranges to the histograms regarding the pixels in the mask region.

* * * * *